United States Patent
Tamanoi et al.

[11] Patent Number: 6,031,794
[45] Date of Patent: Feb. 29, 2000

[54] MAGNETO-OPTICAL RECORDING MEDIUM AND METHOD OF PRODUCING THE SAME

[75] Inventors: Ken Tamanoi; Toshio Sugimoto; Tsutomu Tanaka; Motonobu Mihara; Keiji Shono, all of Kanagawa, Japan

[73] Assignee: Fujitsu Limited, Kawasaki, Japan

[21] Appl. No.: 09/211,735

[22] Filed: Dec. 15, 1998

Related U.S. Application Data

[62] Division of application No. 08/806,223, Feb. 24, 1997, Pat. No. 5,896,350.

[30] Foreign Application Priority Data

Oct. 18, 1996 [JP] Japan .................................. 8-276672

[51] Int. Cl.$^7$ ....................................... G11B 11/00

[52] U.S. Cl. ........................................ 369/13; 428/694 EC

[58] Field of Search ................. 369/13, 14, 110, 369/116, 288, 286, 284, 283, 47; 428/694 MM, 694 MT, 694 EC, 694 ML, 694 SC; 360/59, 116

[56] References Cited

U.S. PATENT DOCUMENTS

| | | | |
|---|---|---|---|
| 5,240,784 | 8/1993 | Matsumoto | 428/694 ML |
| 5,241,520 | 8/1993 | Ohta et al. | 369/13 |
| 5,379,275 | 1/1995 | Kaneko et al. | 369/13 |
| 5,593,791 | 1/1997 | Jujii et al. | 428/394 ML |
| 5,623,458 | 4/1997 | Matsumoto et al. | 369/13 |
| 5,740,133 | 4/1998 | Tamanoi et al. | 369/13 |

FOREIGN PATENT DOCUMENTS

| | | |
|---|---|---|
| 1143041 | 6/1989 | Japan . |
| 2230533 | 9/1990 | Japan . |
| 384754 | 4/1991 | Japan . |
| 393058 | 4/1991 | Japan . |
| 495247 | 3/1992 | Japan . |
| 4271039 | 9/1992 | Japan . |
| 5334741 | 12/1993 | Japan . |
| 7244877 | 9/1995 | Japan . |

*Primary Examiner*—Ali Neyzari
*Attorney, Agent, or Firm*—Greer, Burns & Crain, Ltd.

[57] ABSTRACT

A magneto-optical recording medium, and a method of its production, a method of reading and an apparatus of reading the same capable of decreasing the magnetic field to be applied during MSR readout, or reading without applying magnetic field, by including first, second and third magnetic layers having specified magnetic characteristics.

4 Claims, 23 Drawing Sheets

MAGNETO-OPTICAL RECORDING MEDIUM AND METHOD OF PRODUCING THE SAME

This is a divisional of application Ser. No. 08/806,223, filed Feb. 24, 1997 now U.S. Pat. No. 5,896,350.

BACKGROUND OF THE INVENTION

The present invention relates to a magneto-optical recording medium, such as a magneto-optical disk, a magneto-optical tape and a magneto-optical card, its producing method, its reading method and reading apparatus, and more particularly to a magneto-optical recording medium capable of reading out at magnetically-induced super-resolution.

A magneto-optical disk is known as a high density recording medium, and uses an external magnetic field and a laser beam to form recorded signals (bits) of submicron size on the medium. Accordingly, as compared with the conventional external recording medium such as a floppy disk and a hard disk, the recording capacity can be drastically increased. Recently, in the rapid spread of multimedia, there is an increasing demand for a magneto-optical disk of a larger capacity with the increase of the quantity of information.

To increase the recording capacity of a magneto-optical disk, that is, to enhance the recording density, it is required to reduce the bit size and narrow the bit interval in the peripheral direction. However, recording and readout of bits in the magneto-optical disk are limited by the spot diameter of the emitted light beam. To read out a small bit having a period equal to or smaller than the spot diameter, the beam spot must be reduced to a smaller size, but the beam spot is limited by the wavelength λ of the light source and the number of apertures (NA) of the objective lens, and hence there is a limit to the reduction in the size.

To read out small bits having a period equal to or smaller than the spot diameter by reading out bits from a specific temperature region in a spot by making use of temperature distribution in the spot of a medium, the magnetically-induced super-resolution (MSR) readout method has been proposed in Japanese Patent Application Laid-Open Nos. 1-143041 (1989), 3-93058 (1991), 4-271039 (1992), etc.

The MSR medium capable of reading out at MSR proposed in Japanese Patent Application Laid-Open No. 1-143041 (1989) is capable of detecting bits equal to or smaller than the spot diameter by applying a magnetic field of some hundreds of oersteds (Oe) at the time of readout, but it is not advantageous for heightening the density in the radial direction, since the readout region is wide, and therefore the track pitch cannot be narrowed. The MSR medium proposed in Japanese Patent Application Laid-Open No. 3-93058 (1991) is narrower in the readout region than the MSR medium proposed in Japanese patent Application Laid-Open No. 1-143041, but as the readout power of the light beam is intensified, the region becomes wider, and it is also required to apply an initializing magnetic field of 3.5 to 4.0 kOe. To apply a magnetic field of several kilo-oersteds, it requires a permanent magnet of material of a large energy product such as SmCo and NdFeB, and it is not only expensive, but also made difficult to reduce the size of the readout apparatus.

FIG. 1 is a diagram showing the direction of magnetization at the time of readout of a magneto-optical disk which is an MSR medium proposed in Japanese patent Application Laid-Open No. 4-271039 (1992). This MSR readout method is known as RAD (rear aperture detection) double mask system for reading out recorded bits from an intermediate-temperature region, using the low-temperature region and high-temperature region in the laser spot S as mask regions. A recording disk 50 is composed by laminating a readout layer 51, a readout assisting layer 52, an intermediate layer 53, and a recording layer 54 sequentially on a substrate not shown.

Immediately before emitting a reading laser beam, an initializing magnetic field is applied to the magneto-optical disk by an initializing magnet 55 so that the magnetization direction of the readout layer 51 and the readout assisting layer 52 alone may be aligned with that of the initializing magnetic field. At this time, bits equal to or smaller than the laser spot diameter are recorded in the recording layer 54. When reading, in the region immediately after application of initializing magnetic field (low-temperature region), the readout layer 51 functions as mask in a state of covering the bits recorded in the recording layer 54. In the region exceeding the Curie temperature of the readout assisting layer 52 (high-temperature region) by application of laser beam, the exchange coupled force of the recording layer 54 and readout layer 51 is cut off, and the magnetization direction of the readout layer 51 of that region is aligned with the direction of readout magnetic field Hr applied from outside. As a result, in the high-temperature region, the readout layer 51 becomes a mask for covering the bits. The region enclosed by such low-temperature region and high-temperature region serving as mask (intermediate-temperature region) becomes a transfer region, and bits are read out from this transfer region.

In such conventional MSR readout method, reading from a narrow readout region is possible, and the resolution is high and track pitch is narrow, but in addition to application of a reading magnetic field of some hundreds of oersteds in the laser beam applying region, it is necessary to install an initializing magnet for generating a magnetic field of several kilo-oersteds in order to align the magnetization of both readout layer 51 and readout assisting layer 52 in the direction of initializing magnetic field. As mentioned above, the initializing magnet for generating a magnetic field of several kilo-oersteds is expensive and a large space is needed for compensating for magnetic field leakage, and the reading apparatus is increased in size.

To solve these problems, the present applicant proposed, in Japanese Patent Application Laid-Open No. 7-244877 (1995), an MSR medium composed of three magnetic layers, a readout layer, an intermediate layer, and a recording layer, laminated on a substrate. In this proposed magneto-optical disk, by specifying the material composition, film thickness and magnetic characteristic of each layer, MSR readout is enabled by application of an external field of 1 kOe or less. FIG. 2 is a graph showing temperature characteristics of exchange coupled force between magnetic layers of this magneto-optical disk. The ordinate indicates the exchange coupled force, and the abscissa denotes the temperature.

The exchange coupled force between the readout layer and the intermediate layer (hereinafter called first exchange coupled force) decreases with the increasing temperature, whereas the exchange coupled force between the recording layer and the intermediate layer (hereinafter called second exchange coupled force) increases with the increasing temperature. Accordingly, when reading, in the high-temperature region (about 180° C. or more) and the low-temperature region (about 100° C. or less), a common external magnetic field nearly exceeding the first and second exchange coupled forces is applied, and in the low-temperature region of the magneto-optical disk, the second exchange coupled force is cut off, and the magnetization direction of the intermediate layer is aligned with the direction of the external magnetic field to form a mask. In the high-temperature region, on the other hand, the first exchange coupled force is cut off, and the magnetization direction of the readout layer is aligned with the direction of the external magnetic field to form a mask.

In this reading method of a magneto-optical disk, reading at high resolution is enabled, and the external magnetic field is enough at some hundreds of oersteds. Hence, without having to apply an initializing magnetic field, MSR readout is realized only by application of a reading magnetic field, so that the reading apparatus may be reduced in size.

To read out such MSR medium, it is necessary to apply an external magnetic field of some hundreds of oersteds at all times. If such an external magnetic field is applied by using an electromagnet, the power consumption for reading occupies a larger portion of the power consumption of the recording and reading apparatus. Or when the external magnetic field is large, a large-sized electromagnet is needed, and the power consumption increases.

To reduce the size of electromagnet and lower the power consumption by solving these problems, MSR readout must be realized by a low reading magnetic field. For this purpose, it may be considered to decrease the second exchange coupled force of the magneto-optical disk. FIG. 3 is a graph showing the relation of the shift amount and the minimum reading magnetic field of the magneto-optical disk having the magnetic characteristics shown in FIG. 2, and the ordinate indicates the minimum reading magnetic field, and the abscissa denote the shift amount. Herein, the shift amount is a value expressing the magnetic characteristic of the magnet-optical disk, and it is a guideline value for the magnitude of the exchange coupled force. FIG. 4 is a graph showing the relation of the shift amount and the SN ratio, in which the ordinate indicates the SN ratio and the abscissa denotes the shift amount. As shown in FIG. 3, as the shift amount decreases, the minimum reading magnetic field becomes lower, and it is apparent that the mask can be formed by a lower magnetic field as the exchange coupled force is weaker. However, as shown in FIG. 4, when the shift amount is small, the SN ratio is low, and when the exchange coupled force between the recording layer and the intermediate layer is too weak, it is difficult to read the recorded bit accurately.

BRIEF SUMMARY OF THE INVENTION

The invention is devised to solve the above problems, and it is hence an object of the invention to present a magneto-optical recording medium capable of reading out at MSR by application of an external magnetic field by an initializing magnet of 1 kOe or less, without application of a reading magnetic field, and reducing power consumption in readout, and its producing method, reading method and reading apparatus.

The magneto-optical recording medium of the invention is a magneto-optical recording medium for reading out information from a region specified by temperature distribution in a medium formed by application of light beam accompanied by the relative move with the magneto-optical recording medium comprising, a substrate; a first magnetic layer on the substrate; a second magnetic layer laminated on the first magnetic layer and magnetically coupled with the first magnetic layer, and having a first exchange coupled force decreasing with the increasing temperature between the first magnetic layer and the second magnetic layer; and a third magnetic layer laminated on the second magnetic layer and magnetically coupled with the second magnetic layer, and having a second exchange coupled force increasing with the increasing temperature between the second magnetic layer and the third magnetic layer, wherein the second exchange coupled force is not larger than the coercive force of the first magnetic layer at a temperature lower than a predetermined temperature for reading out the information.

For example, when a light beam is applied to a magneto-optical recording medium such as a magneto-optical disk being accompanied by a relative move, a temperature distribution is formed in the peripheral direction of the magneto-optical disk. The temperature region where information is read out is specified in the spot irradiated with the light beam depending on the film composition of the first, second and third magnetic layers. When reading, if a magnetic field is applied in a region of the magneto-optical disk where the temperature is lower than the temperature of the region for reading out information, first the second magnetic layer is aligned with the direction of the initializing magnetic field, and the magnetization direction of the first magnetic layer is aligned by the first exchange coupled force. Along with the passing of the time until this region comes closer to the irradiation spot of reading light beam, the magnetization direction is more likely to return to the original state. In the invention, at a temperature lower than the temperature of information reading, the coercive force of the first magnetic layer is greater than the second exchange coupled force, and therefore the magnetization direction of the first magnetic layer does not return to the original state with the passing of the time, but maintains the aligned state up to the irradiation spot position. Hence, the magnetization direction of the third magnetic layer is masked in the low-temperature region.

Consequently, in the information readout temperature region, that is, in the intermediate-temperature region, the magnetization direction of the third magnetic layer is transferred to the first magnetic layer, and it is read out. In the higher temperature region than the intermediate-temperature region, the first exchange coupled force is cut off, and the magnetization direction of the first magnetic layer is aligned with the magnetization of the first magnetic layer around the bit, and the magnetization direction of the third magnetic layer is masked again. Accordingly, without having to apply a reading magnetic field near the irradiation spot of the light beam, masks are formed in the low-temperature region and the high-temperature region, so that information can be read out from the intermediate-temperature region. In this way, when the magnetic field to be applied to the low-temperature region is generated by using a permanent magnet, the power consumption can be reduced.

In the magneto-optical recording medium of the invention, the first magnetic layer is characterized by having a magnetic characteristic in which the rare-earth magnetization is dominant.

Therefore, since the first magnetic layer is dominant in rare-earth magnetization, as compared with the first magnetic layer dominant in transition-metal magnetization or in compensatory composition, the temperature range in which the second exchange coupled force is not larger than the coercive force of the first magnetic layer is wider. Hence, the mask of the low-temperature region can be formed securely.

The magneto-optical recording medium of the invention is also characterized by having a control film for controlling the strength of the second exchange coupled force between the second magnetic layer and the third magnetic layer.

Therefore, when the control film is, for example, nitride film or oxide film, the second exchange coupled force is decreased. As a result, the second exchange coupled force is smaller than the coercive force of the first magnetic layer, so that the mask of the low-temperature region may be formed easily.

The producing method of a magneto-optical recording medium of the invention is a producing method of a magneto-optical recording medium for reading out information from a region specified by temperature distribution in a medium formed by irradiating with light beam accompanied by the relative move with the magneto-optical recording medium comprising, the step of laminating a first magnetic layer on a substrate; the step of laminating a second magnetic layer on the first magnetic layer, magnetically coupled with the first magnetic layer, having a first exchange coupled force decreasing with the increasing temperature, between the first magnetic layer and the second magnetic layer; the step of performing oxidation or nitridation for a predetermined period on the second magnetic layer after completing the laminating step of the second magnetic layer; and the step of laminating a third magnetic layer on the second magnetic layer after completing the step of oxidation or nitridation, magnetically coupled with the second magnetic layer, having a second exchanged coupled force increasing with the increasing temperature, between the second magnetic layer and the third magnetic layer.

The producing method of a magneto-optical recording medium of the invention also comprises the step of laminating a first magnetic layer on a substrate; the step of laminating a second magnetic layer on the first magnetic layer, magnetically coupled with the first magnetic layer, having a first exchange coupled force decreasing with the increasing temperature, between the first magnetic layer and the second magnetic layer; the step of laminating a part of a third magnetic layer on the second magnetic layer after completing the laminating step of the second magnetic layer, magnetically coupled with the second magnetic layer, having a second exchanged coupled force increasing with the increasing temperature, between the second magnetic layer and the third magnetic layer, in atmosphere of oxygen or nitrogen; and the step of laminating the remainder of the third magnetic layer, after removing the oxygen or nitrogen, after the step of laminating a part of the third magnetic layer.

The producing method of a magneto-optical recording medium of the invention also comprises the step of laminating a first magnetic layer on a substrate; the step of laminating a second magnetic layer on the first magnetic layer, magnetically coupled with the first magnetic layer, having a first exchange coupled force decreasing with the increasing temperature, between the first magnetic layer and the second magnetic layer; the step of laminating a control layer formed from silicon, anti-ferromagnetic metal or complete non-magnetic metal, on the second magnetic layer after completing the laminating step of the second magnetic layer; and the step of laminating a third magnetic layer on the control layer, magnetically coupled with the second magnetic layer, having a second exchanged coupled force increasing with the increasing temperature, between the second magnetic layer and the third magnetic layer, wherein the control layer controls the exchange coupled force of the second magnetic layer and the third magnetic layer.

Therefore, in these inventions, at the side of the second magnetic layer closer to the third magnetic layer, the side of the third magnetic layer closer to the second magnetic layer, or between the second magnetic layer and the third magnetic layer, the control layer for decreasing the second exchange coupled force is formed, so that a mask of the low-temperature region can be formed by application of a low reading magnetic field. Moreover, the control layer which serves to decrease the second exchanged coupled force in the low-temperature region has a perpendicular magnetic anisotropy in the intermediate-temperature region, and therefore the second exchange coupled force is increased in the intermediate-temperature region, so that the transfer performance is enhanced.

The reading method of a magneto-optical recording medium of the invention comprises the step of forming a temperature distribution by irradiating the magneto-optical recording medium with light beam accompanied by a relative move in the magneto-optical recording medium including a magnetically coupled first magnetic layer, a second magnetic layer and a third magnetic layer sequentially on a substrate, having information recorded therein as the region inverted in the magnetization direction from a first direction to a second direction and the region maintaining the first direction are formed in the third magnetic layer at the time of recording; the step of applying a magnetic field in the second direction, without applying a magnetic field in the region irradiated with the light beam, so as to align the magnetization direction of the first magnetic layer and second magnetic layer, respectively, in the region where the temperature is lower than the information readout temperature region specified by the temperature distribution; and the step of reading out information from the information readout temperature region.

In the reading method of a magneto-optical recording medium of the invention, moreover, the first magnetic layer and the second magnetic layer has a first exchange coupled force between them, the second magnetic layer and the third magnetic layer has a second exchange coupled force between them, the first exchange coupled force decreases with as the increasing temperature, and the second exchange coupled force increases with the increasing temperature, and the second exchange coupled force is not larger than the coercive force of the first magnetic layer at a temperature lower than the predetermined temperature for reading out the information.

Therefore, at the time of reading, by applying an initializing magnetic field by using, for example, a permanent magnet at the low-temperature region of the magneto-optical recording medium, the magnetization direction can be maintained without application of a reading magnetic field for the period of moving of the region aligned in the magnetization direction of the first magnetic layer to the vicinity of the irradiation spot. As a result, the power required for reading magnetic field is reduced, and the power consumption is saved.

The reading apparatus of a magneto-optical recording medium of the invention comprises a light beam source for emitting light beam being accompanied by a relative move so as to form a temperature distribution in a magneto-optical recording medium including a magnetically coupled first magnetic layer, a second magnetic layer and a third magnetic layer sequentially on a substrate, and having information recorded as the magnetization direction of each region in the third magnetic layer is determined; and a magnet disposed at position of a lower temperature than the opposite side of the light beam irradiating position across the middle of the magneto-optical recording medium, and generating a magnetic field for aligning the magnetization direction of the first magnetic layer and the second magnetic layer, respectively.

In the reading apparatus of a magneto-optical recording medium of the invention, moreover, the first magnetic layer and the second magnetic layer has a first exchange coupled force between them, the second magnetic layer and the third magnetic layer has a second exchange coupled force between them, the first exchange coupled force decreases with the increasing temperature, the second exchange coupled force increases with the increasing temperature, and the second exchange coupled force is not larger than the coercive force of the first magnetic layer at a temperature lower than the predetermined temperature for reading out the information.

Therefore, since the magnet is disposed at the low temperature region of the magneto-optical recording medium, that is, at the front side of the reading light beam, after applying a magnetic field in the low-temperature region at the time of reading, the time required for this region to move up to the irradiation spot is shorter. Hence, the magnetization direction of the first magnetic layer aligned by the initializing magnetic field is maintained up to the region immediately before the readout region, so that the mask may be formed securely at the low-temperature region.

It is another object of the invention to present a magneto-optical recording medium and its producing method capable of reading out at MSR by application of lower reading magnetic field, without deterioration of the quality of a readout signal, and reducing the power consumption at the time of reading.

The magneto-optical recording medium of the invention is a magneto-optical recording medium for reading out information from a region specified by temperature distribution in a medium formed by irradiation with light beam accompanied by a relative move with the magneto-optical recording medium comprising, a substrate; a first magnetic layer on the substrate; a second magnetic layer laminated on the first magnetic layer and magnetically coupled with the first magnetic layer, and having a first exchange coupled force decreasing with the increasing temperature, between the first magnetic layer and the second magnetic layer; and a third magnetic layer laminated on the second magnetic layer and magnetically coupled with the second magnetic layer, and having a second exchange coupled force increasing with the increasing temperature, between the second magnetic layer and the third magnetic layer, wherein a control film for controlling the strength of the second exchange coupled force is disposed between the second magnetic layer and the third magnetic layer.

When reading the magneto-optical recording medium, if a reading magnetic field is applied near the irradiated spot of light beam, in the low-temperature region, the magnetization direction of the second magnetic layer is aligned in the direction of a reading magnetic field, so that the magnetization direction of the first magnetic field is aligned. In the high-temperature region, the first exchange coupled force is cut off, and the magnetization direction of the first magnetic layer is aligned with the direction of a reading magnetic field. In the intermediate-temperature region enclosed therebetween, the magnetization direction of the third magnetic layer is transferred to the first magnetic layer by the first and second exchange coupled forces. In the invention, since the control film for decreasing the second exchange coupled force is provided, the second exchange coupled force in the low-temperature region can be cut off by application of a lower magnetic field, and the magnetization direction of the second magnetic layer can be aligned.

In the magneto-optical recording medium of the invention, the control film is a nitride film or an oxide film formed at the interface between the second magnetic layer and the third magnetic layer.

Therefore, the second exchange coupled force is decreased by the presence of a nitride film or an oxide film between the second magnetic layer and the third magnetic layer. Hence, by application of a low magnetic field, the second exchange coupled force can be cut off, and the magnetic direction of the second magnetic layer can be aligned.

In the magneto-optical recording medium of the invention, the control film is formed from any one of silicon, anti-ferromagnetic metal, and complete non-magnetic metal.

Therefore, the second exchange coupled force is decreased due to the presence of silicon, anti-ferromagnetic metal or complete non-magnetic metal between the second magnetic layer and the third magnetic layer. Hence, by application of a low magnetic field, the second exchange coupled force can be cut off, and the magnetization direction of the second magnetic layer can be aligned.

Also in the magneto-optical recording medium of the invention, the control film is a rare-earth magnetization dominant magnetic film formed from an alloy of rare-earth and transition-metal, and has characteristic of easy magnetization in an in-plane direction at a temperature lower than the temperature for information readout, and has characteristics of easy magnetization in a crossing direction to the in-plane direction near the temperature of the region where information is read out.

Therefore, when reading the magneto-optical recording medium, if a reading magnetic field is applied near the irradiated spot of light beam, in the low-temperature region, the second exchange coupled force is decreased by the control film of an alloy of rare-earth and transition-metal, and in the intermediate-temperature region, the control film has a perpendicular magnetic anisotropy, and increases the second exchange coupled force. Accordingly, by applying a low reading magnetic field, the mask can be formed in the low-temperature region, and the second exchange coupled force is increased in the intermediate-temperature region, and therefore the transfer performance does not deteriorate, and a favorable readout characteristic may be obtained.

Moreover, in the magneto-optical recording medium of the invention, the control film has a thickness of 5 nm or less.

If the control film is too thick, the second exchange coupled force is decreased too much in the intermediate-temperature region, and the transfer performance deteriorates. The film thickness is preferred to be equal to or greater than the minimum diameter of nitrogen molecular, oxygen molecule or metal atom and less than 5 nm.

The producing method of magneto-optical recording medium with the object of enabling MSR readout by application of a lower reading magnetic field has the same means as in the case intended to nullify the reading magnetic field.

The above and further objects and features of the invention will more fully be apparent from the following detailed description with the accompanying drawings.

DETAILED DESCRIPTION OF THE INVENTION

Figure 1:
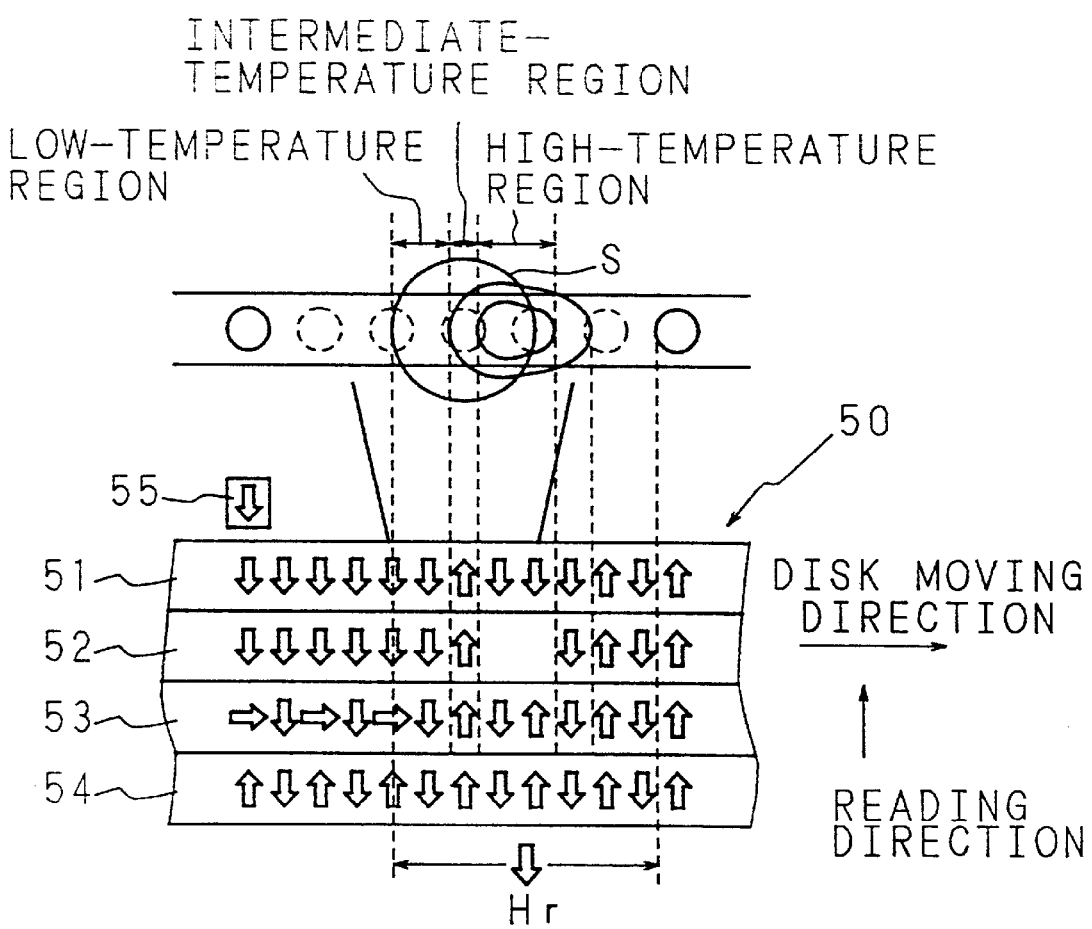
FIG. 1 is a diagram showing a magnetization direction at the reading time of a conventional magneto-optical disk.
Figure 2:
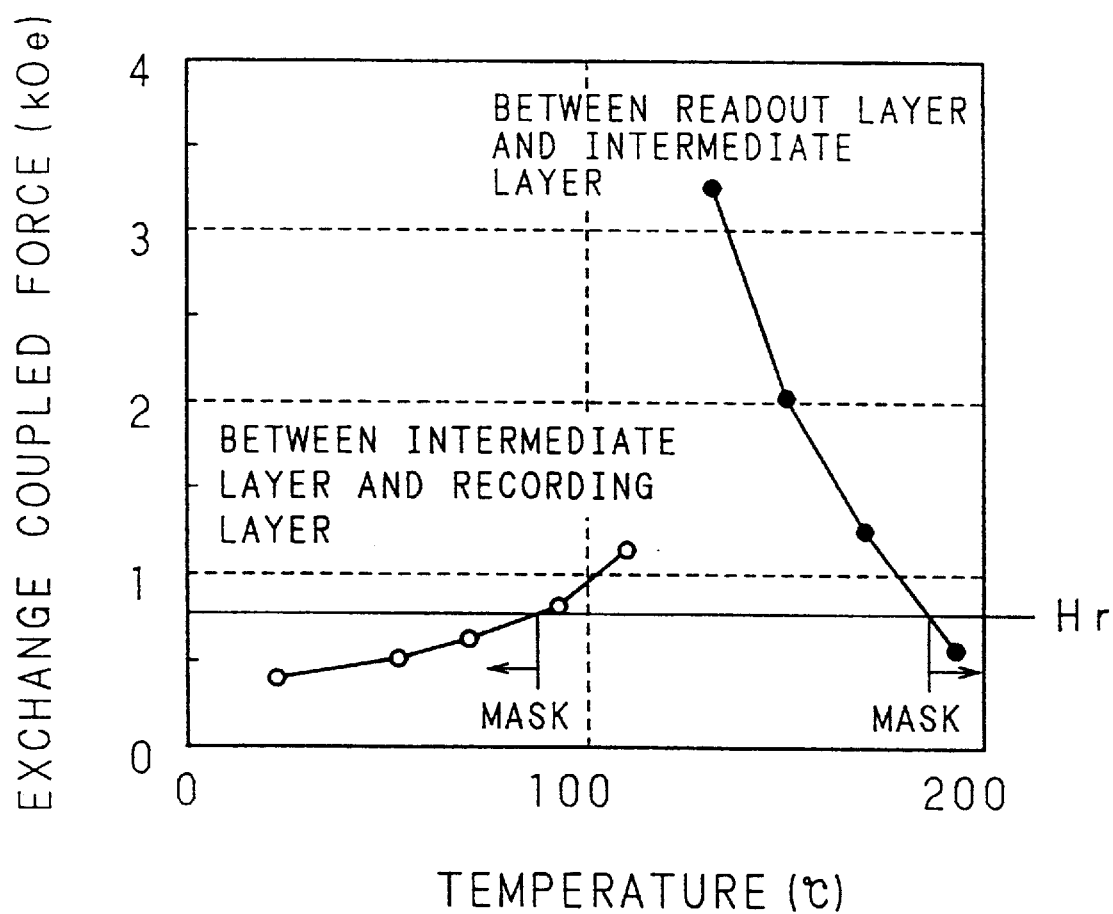
FIG. 2 is a graph showing an exchange coupled force between magnetic layers in a magneto-optical disk disclosed in Japanese Patent Application Laid-Open No. 7-244877 (1995)

Referring now to the drawings, embodiments of the invention are described specifically below.

Embodiment 1

Figure 5:
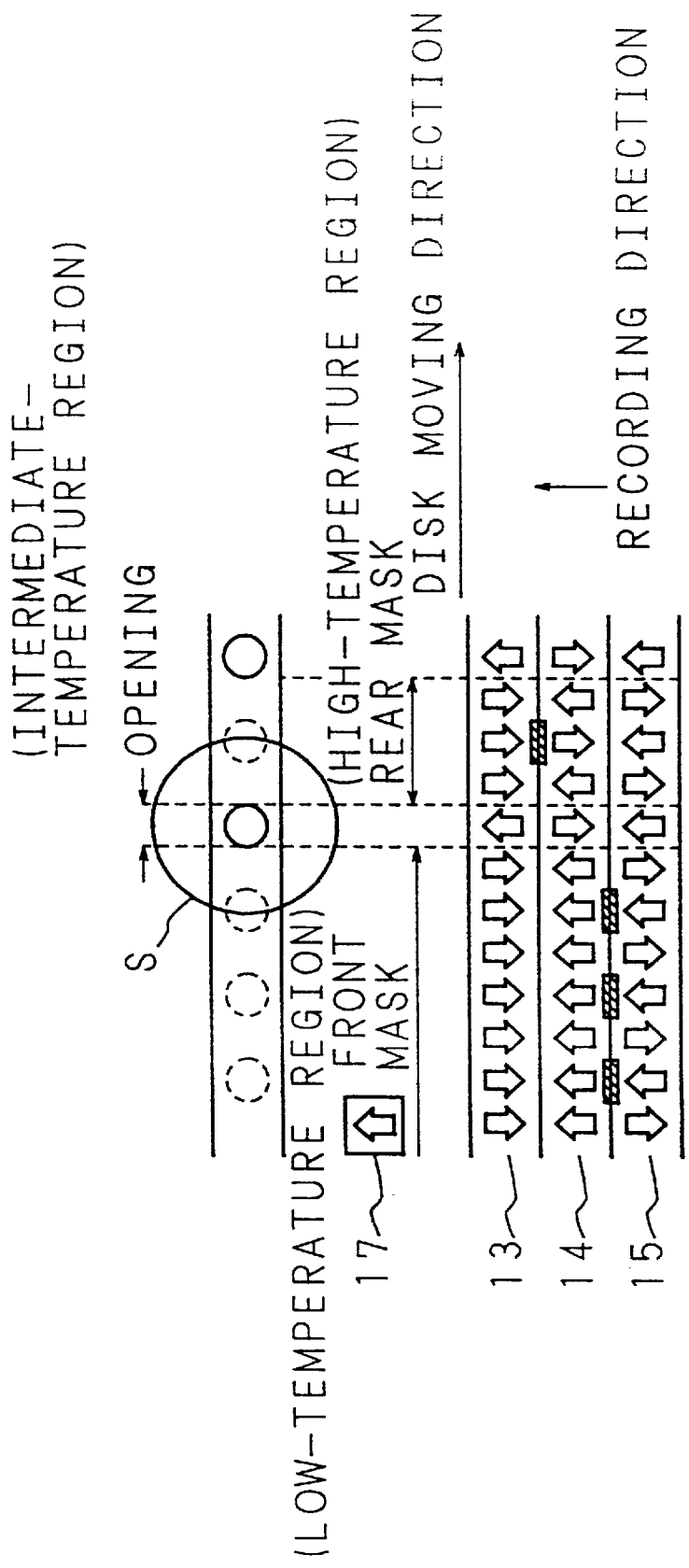
FIG. 5 is a diagram showing a magnetization state at the reading time of a magneto-optical disk of the invention.
Figure 6:
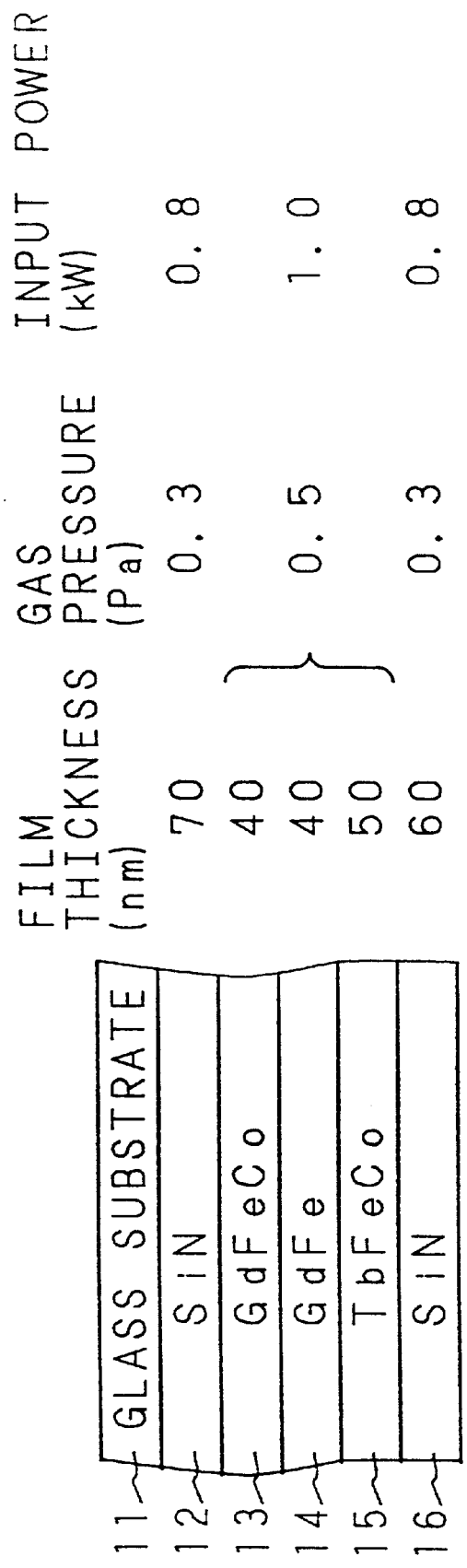
FIG. 6 is a film composition diagram of a magneto-optical disk of the invention.

FIG. 5 is a diagram showing a magnetization state at the reading time of a magneto-optical disk of the invention, and FIG. 6 is a diagram showing the film composition of this magneto-optical disk. A magneto-optical disk 10 is formed from laminating a base layer 12 of 70 nm in film thickness made of SiN, a readout layer 13 (first magnetic layer) of 40 nm in film thickness made of GdFeCo, an intermediate layer 14 (second magnetic layer) of 40 nm in film thickness made of GdFe, a recording layer 15 (third magnetic layer) of 50 nm in film thickness made of TbFeCo, and a protective layer 16 of 60 nm in film thickness made of SiN, sequentially on a glass substrate 11. More specifically, the readout layer 13 is a rare-earth magnetization dominant (hereinafter called RE rich) vertical magnetization film, the intermediate layer 14 is an RE rich in-plane magnetization film free from compensation point up to the Curie temperature, and the recording layer 15 is a transition- metal magnetization dominant (hereinafter called TM rich) vertical magnetization film. In FIG. 5, the substrate 11, the base layer 12, and the protective layer 16 are omitted.

Each layer is sequentially formed by the DC sputtering method. The sputtering condition is gas pressure of 0.3 Pa and input power of 0.8 kW when forming the SiN layers, and gas pressure of 0.5 Pa and input power of 1.0 kW when forming the magnetic layers. The film was formed at a final degree of vacuum of $5 \times 10^{-5}$ Pa or less in a chamber. After continuously laminating the base layer 12, the readout layer 13 and the intermediate layer 14 on the substrate 1, and letting them stand for about 30 minutes in a bell jar, the recording layer 15 and the protective layer 16 were laminated. Letting them stand in the bell jar was intended to oxidize the surface of the recording layer 15 side of the intermediate layer 14 to decrease the exchange coupled force between the intermediate layer 14 and the recording layer 15.

Figure 7:
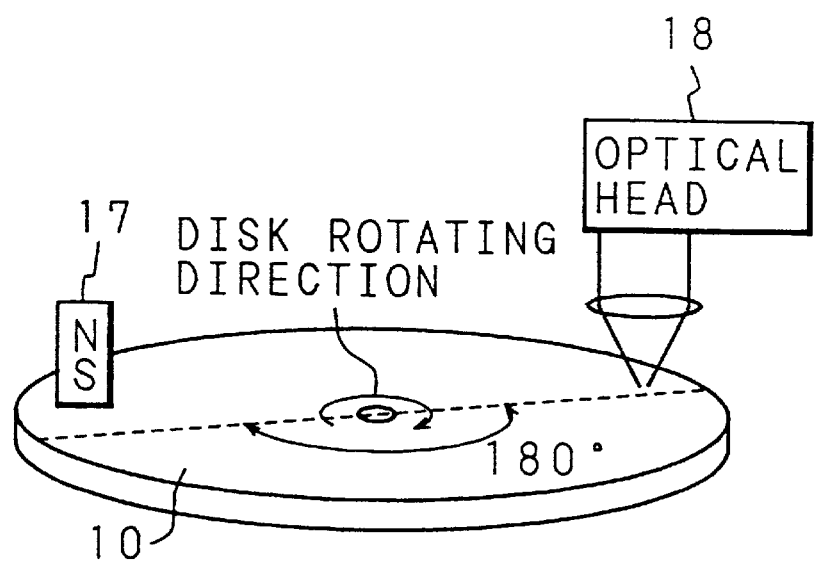
FIG. 7 is a diagram showing an optical head and an initializing magnet of a reading apparatus of a magneto-optical disk of the invention.

To read a bit recorded in the recording layer 15 of thus composed magneto-optical disk 10, a reading laser beam is emitted from the position closer to the substrate 11 of the magneto-optical disk 10. FIG. 7 is an explanatory diagram showing the configuration of an optical head and an initializing magnet at the reading time of the magneto-optical disk of the invention. In the diagram, reference numeral 18 is an optical head, which comprises a laser beam source for emitting a reading laser beam, and an optical system for irradiating the magneto-optical disk 10, being disposed opposite to the surface of the magneto-optical disk 10, at a position for being irradiated with laser beam, closer to the substrate 11. Across the center of the magneto-optical disk 10, an initializing magnet 17 is disposed at a position of 180 degrees to the irradiation spot S of the laser beam. The initializing magnet 17 is a common permanent magnet made of Ba ferrite.

Figure 8:
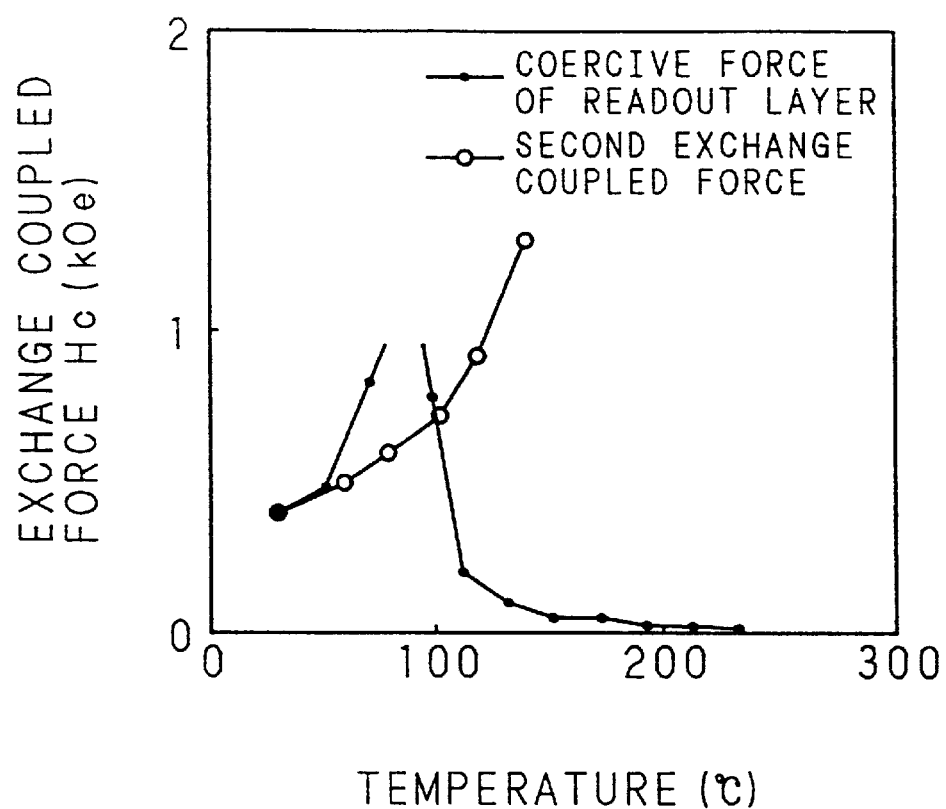
FIG. 8 is a graph showing the relation of a second exchange coupled force and a coercive force of readout layer of a magneto-optical disk in a first embodiment.

The magnetization state at the reading time of the magneto-optical disk 10 in FIG. 5 is described below. In the low-temperature region (a region lower than about 100° C.) at the forward side of the laser beam of the magneto-optical disk 10, the bits in the intermediate layer 14 and the readout layer 13 are aligned in the same direction, and the bits recorded in the recording layer 15 are masked (front mask). FIG. 8 is a graph showing the temperature dependence of the exchange coupled force (second exchange coupled force) between the recording layer 15 and the intermediate layer 14 of the magneto-optical disk 10, and the temperature dependence of the coercive force of the readout layer 13. The ordinate denotes the exchange coupled force and the abscissa represents the temperature.

As clear from the graph, at a temperature lower than about 100° C., the relation of;

second exchange coupled force ≦ coercive force of readout layer 13 is established. Accordingly, when passing the initializing magnet 17, the magnetization direction of the readout layer 13 is aligned in one direction, and the magnetization direction of this region is maintained until moving into the laser beam spot S, thereby forming the front mask. For example, if the above relation between the magnitudes of the forces is reversed, the magnetization direction aligned in one direction returns to the initial state when moving into a region where the magnetic field of the initializing magnet does not act, and hence the front mask is not formed. Incidentally, as the transition-metal magnetization of the readout layer 13 becomes dominant, the coercive force divergence temperature is shifted to the lower temperature side, and the above relation between the magnitudes of the forces at the low-temperature side of the magneto-optical disk 10 cannot be established, making it difficult to form the front mask.

Figure 9:
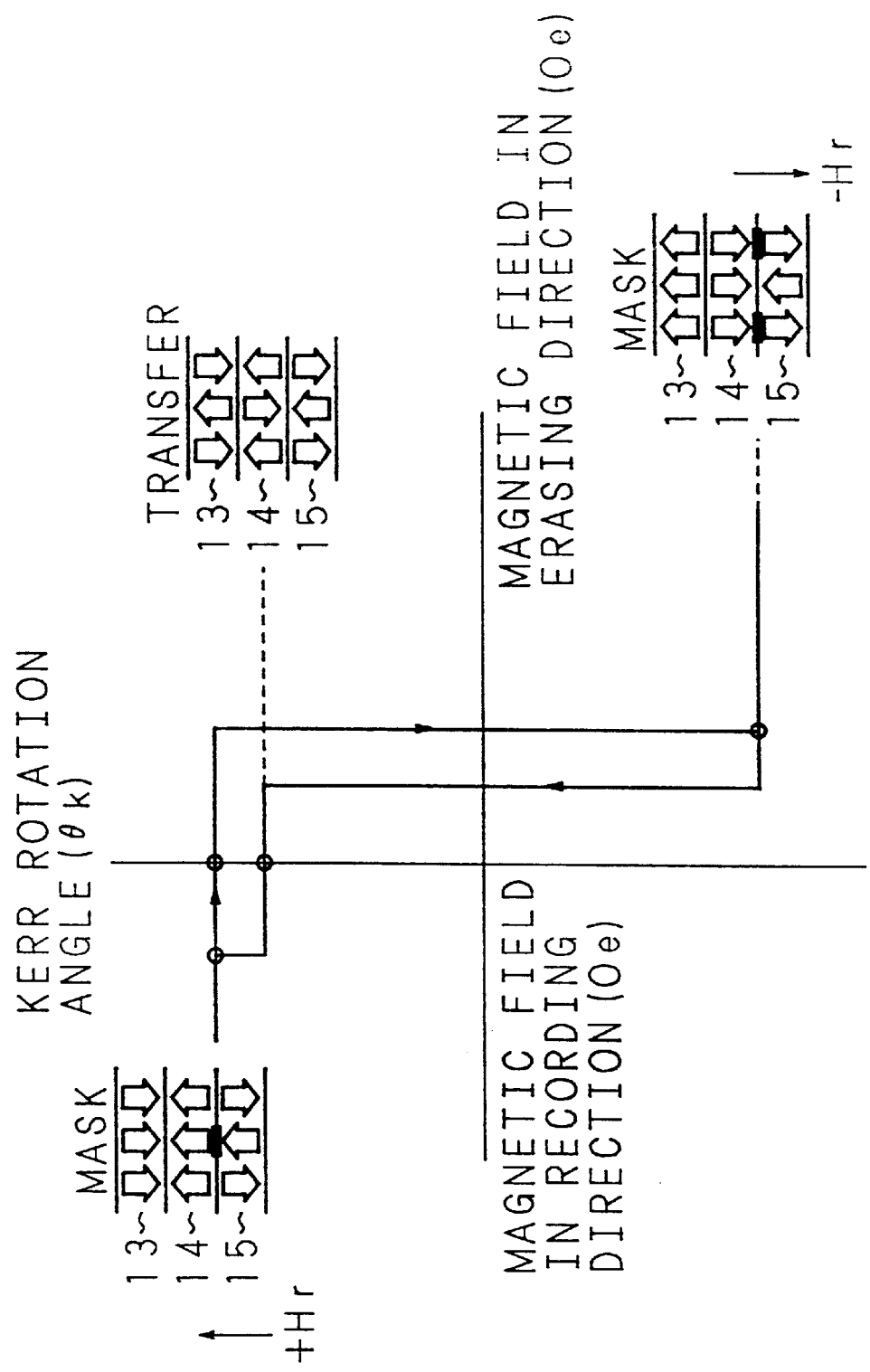
FIG. 9 is a diagram showing a hysteresis loop of Kerr rotation angle in a low-temperature condition and a magnetization state in the magneto-optical disk in the first embodiment.

In this way, the magnetization direction of the initializing magnet to determine the magnetization direction of the intermediate layer 14 in the low-temperature region is the same as the recording direction of the recording layer 15. FIG. 9 is a diagram showing a hysteresis loop for the Kerr rotation angle θk measured in an external magnetic field smaller than the coercive force of the recording layer 15 in the low-temperature state of the magneto-optical disk 10, and the magnetization state in that hysteresis loop. The ordinate indicates the Kerr rotation angle, and the abscissa shows an external magnetic field, the right side showing the magnetic field in the erasing direction, and the left side, in the recording direction. In the recording layer 15, the portion in which the magnetization direction is an upward one corresponds to the recorded bit. As shown in the diagram, by applying an external magnetic field in the recording direction to nullify the external magnetic field for the mask formed state, the mask state is maintained. However, when the external magnetic field is nullified from the mask formed state by applying an external magnetic field in the erasing direction, it can be seen that a transfer state is established. Hence, to maintain the aligned state of the magnetization direction aligned by the initializing magnetic field even if the magnetization direction moves into the region where the initializing magnetic field doe not act, it is necessary to apply the initializing magnetic field in the recording direction.

In the intermediate-temperature region (a region of about 100° C. to about 180° C.) shown in FIG. 5, the magnetization direction of the recording layer 15 is transferred to the readout layer 13 through the intermediate layer 14 by the first and second exchange coupled forces, and bits are reproduced from this opening.

The high-temperature region (a region higher than about 180° C.) is a region beyond the Curie temperature of the intermediate layer 14. Notably, the first exchange coupled force is cut off in the high-temperature region. Accordingly, the magnetization direction of the readout layer 13 is aligned in the magnetization direction of the readout layer 13 around the bit, and is aligned in one direction to form a rear mask.

Figure 10:
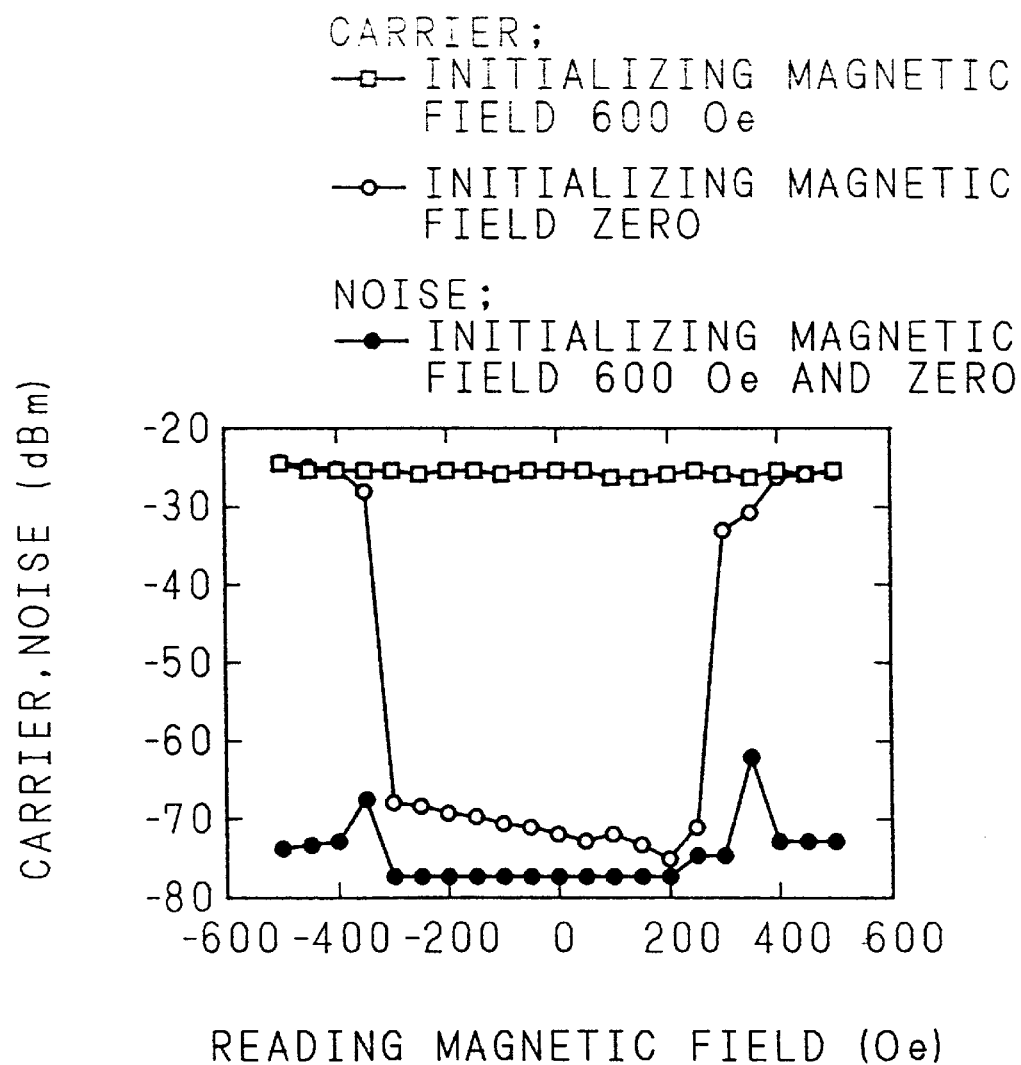
FIG. 10 is a graph showing the dependence on a reading magnetic field of the magneto-optical disk in the first embodiment.

In such the magneto-optical disk 10, bits of 0.36 μm were recorded in the condition of linear velocity of 6 m/s, recording laser beam power of 7 mW, and recording magnetic field of 250 Oe, reading magnetic fields of different magnitudes were applied, and carrier and noise were measured when an initializing magnetic file dog 600 Oe was applied and when the initializing magnetic field was zero, respectively. FIG. 10 is a graph showing the results. The ordinate denotes the carrier and noise, and the abscissa represents the reading magnetic field, the positive direction showing the recording direction and the negative direction showing the erasing direction. As shown in the graph, when the initializing magnetic field of 600 Oe was applied, even if the reading magnetic field was not applied, almost the same level of carrier as produced when the conventional reading magnetic field was applied was produced. At this time, the CN ratio was 48 dB. By contrast, without application of initializing magnetic field, when the reading magnetic field was zero, almost no carrier was produced, and when the reading magnetic field of 400 Oe or more was applied in the recording direction and the erasing direction, nearly the same level of carrier as in the case of initializing magnetic field of 600 Oe was produced. Meanwhile, the noise was at the same level in both cases where the initializing magnetic field was 600 Oe and where the initializing magnetic field was zero.

Figure 11:
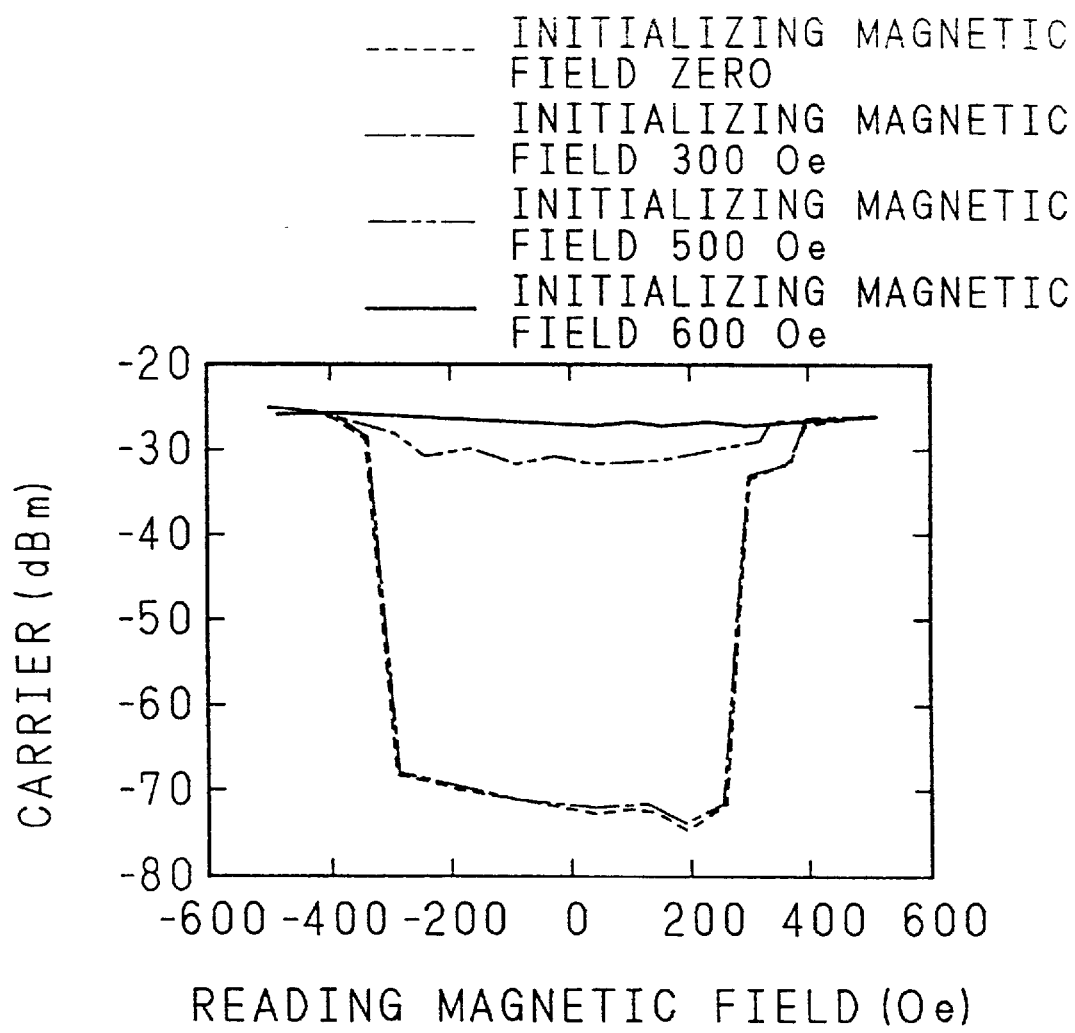
FIG. 11 is a graph showing the dependence on a reading magnetic field and an initializing magnetic field of the magneto-optical disk in the first embodiment.

Besides, by varying the magnitude of the initializing magnetic field, the carrier of the magneto-optical disk 10 was measure din the same condition as the above. FIG. 11 is a graph showing the results. The ordinate indicates the carrier, and the abscissa denotes the reading magnetic field, the positive direction showing the recording direction and the negative direction showing the erasing direction. As shown in the graph, as far as the initializing magnetic field is up to about 300 Oe, carrier was not produced when the reading magnetic field was not applied, but when the initializing magnetic field was 600 Oe or more, the carrier was stably produced without applying the reading magnetic field.

Figure 12:
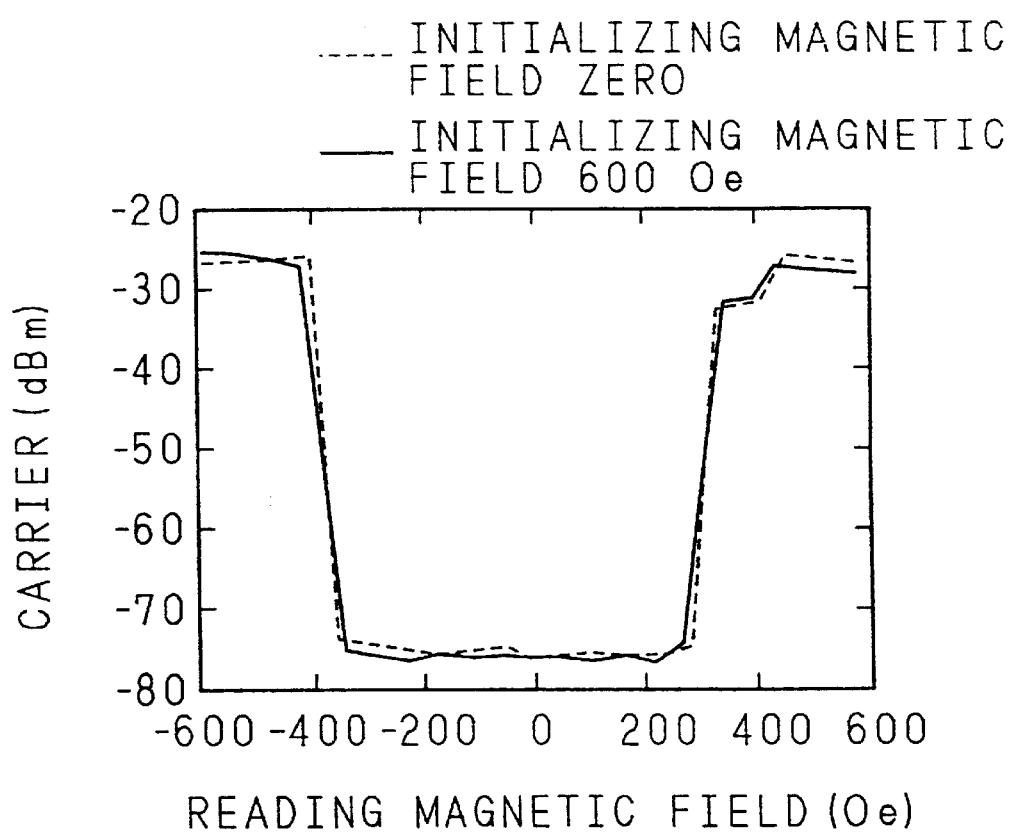
FIG. 12 is a graph showing the depending on a reading magnetic field of a magneto-optical disk in a comparative example.

As a comparative example of the aforementioned first embodiment, a magneto-optical disk was prepared by using a TM rich vertical magnetization film in the readout layer 13, and the carrier was measured under similar conditions. FIG. 12 is a graph showing the results. The ordinate indicates the carrier, and the abscissa denotes the reading magnetic field, the positive direction showing the recording direction, and the negative direction showing the erasing direction. As shown in the graph, the result was the same in the case where an initializing magnetic field of 600 Oe was applied and in the case where an initializing magnetic field was not applied, and carrier was not produced when the reading magnetic field was zero. Thus, in the magneto-optical disk 10 of embodiment 1, without application of reading magnetic field, the MSR readout was found possible by applying an initializing magnetic field of 600 Oe or more.

Figure 13:
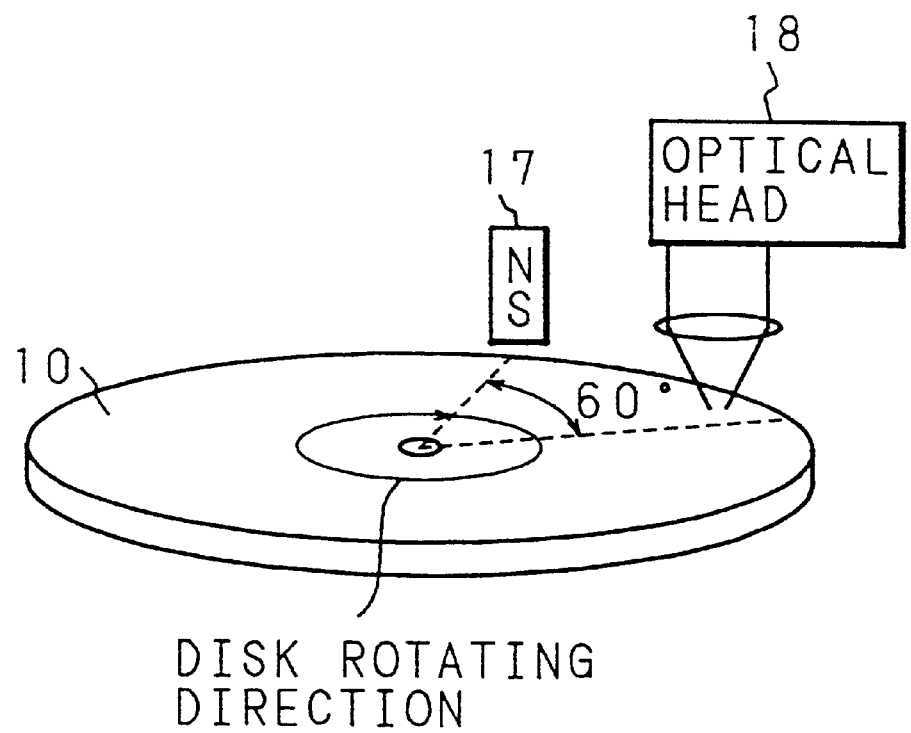
FIG. 13 is a diagram showing an optical head and an initializing magnet of another reading apparatus of a magneto-optical disk of the invention.

As another example of the first embodiment, a magneto-optical disk was prepared by using a vertical magnetization film in compensatory composition in the readout layer 13, and the carrier was measured in similar conditions. In addition, the carrier of this magneto-optical disk was measured by varying the position of the initializing magnet 17. FIG. 13 is a diagram showing the configuration of the initializing magnet 17 at this time. The initializing magnet 17 is disposed at a position forming an angle of 60 degrees with the irradiation spot S at the forward side of the laser beam across the center of the magneto-optical disk 10. The rest of the configuration is the same as in FIG. 7, and its explanation is omitted. With this configuration of the initializing magnet 17, as compared with the configuration in which the initial magnet 17 is disposed at the position forming an angle of 180 degrees, the magnetization direction can be aligned in the region of weaker second exchanged coupled force at a low temperature. Accordingly, it is easier to form the front mask when reading the magneto-optical disk having the magnetic characteristic in which the temperature range for satisfying the upper and lower relation of the exchange coupled force and coercive force as mentioned above is shifted to lower temperature.

Figure 14:
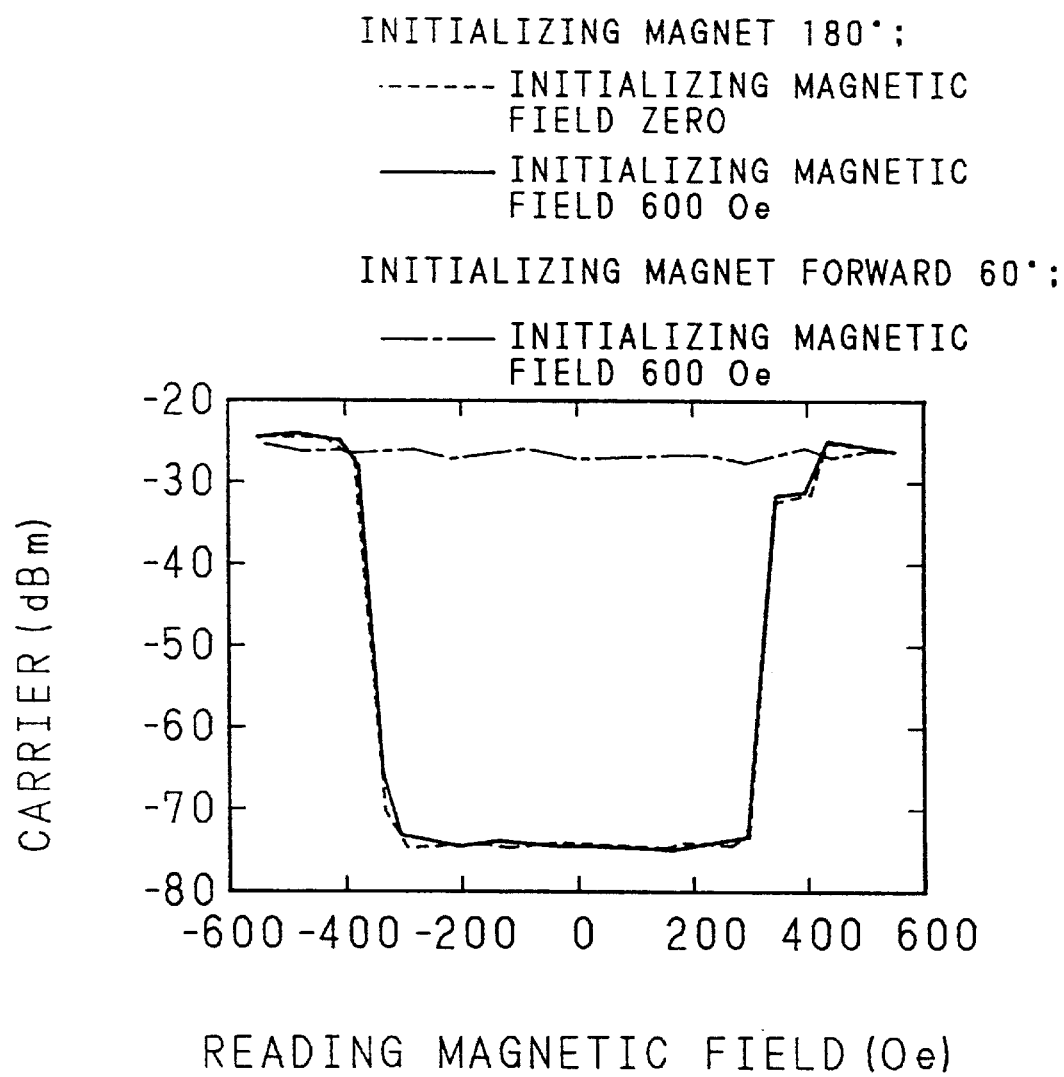
FIG. 14 is a graph showing the dependence on a reading magnetic field of another magneto-optical disk in the first embodiment.

FIG. 14 is a graph showing the results of the configuration of the initializing magnet 17 at 180 degrees and 60 degrees.

The ordinate indicates the carrier, and the abscissa denotes the reading magnetic field, the positive direction showing the recording direction and the negative direction, the erasing direction. As shown in FIG. 14, in the configuration of the initializing magnet 17 of 180 degrees, carrier was not produced in either of the cases where an initializing magnetic field of 600 Oe was applied or where the initializing magnetic field was not applied. By contrast, in the configuration of the initializing magnet at 60 degrees, when an initializing magnetic field at 600 Oe was applied, the carrier was produced stably without applying a reading magnetic field. Accordingly, if the readout layer 13 is of compensatory composition, by adjusting the position of the initializing magnetic field, the MSR readout is enabled without application of a reading magnetic field.

Embodiment 2

The above magneto-optical disk was prepared in a different producing procedure from embodiment 1, and the second exchange coupled force was also different from that of the first embodiment. Aside from the difference in the producing procedure as mentioned below, the film composition, the material composition, the film thickness and the sputtering condition were the same as in embodiment 1, and the description is omitted herein. The readout layer 13 was an RE rich vertical magnetization film.

Figure 15:
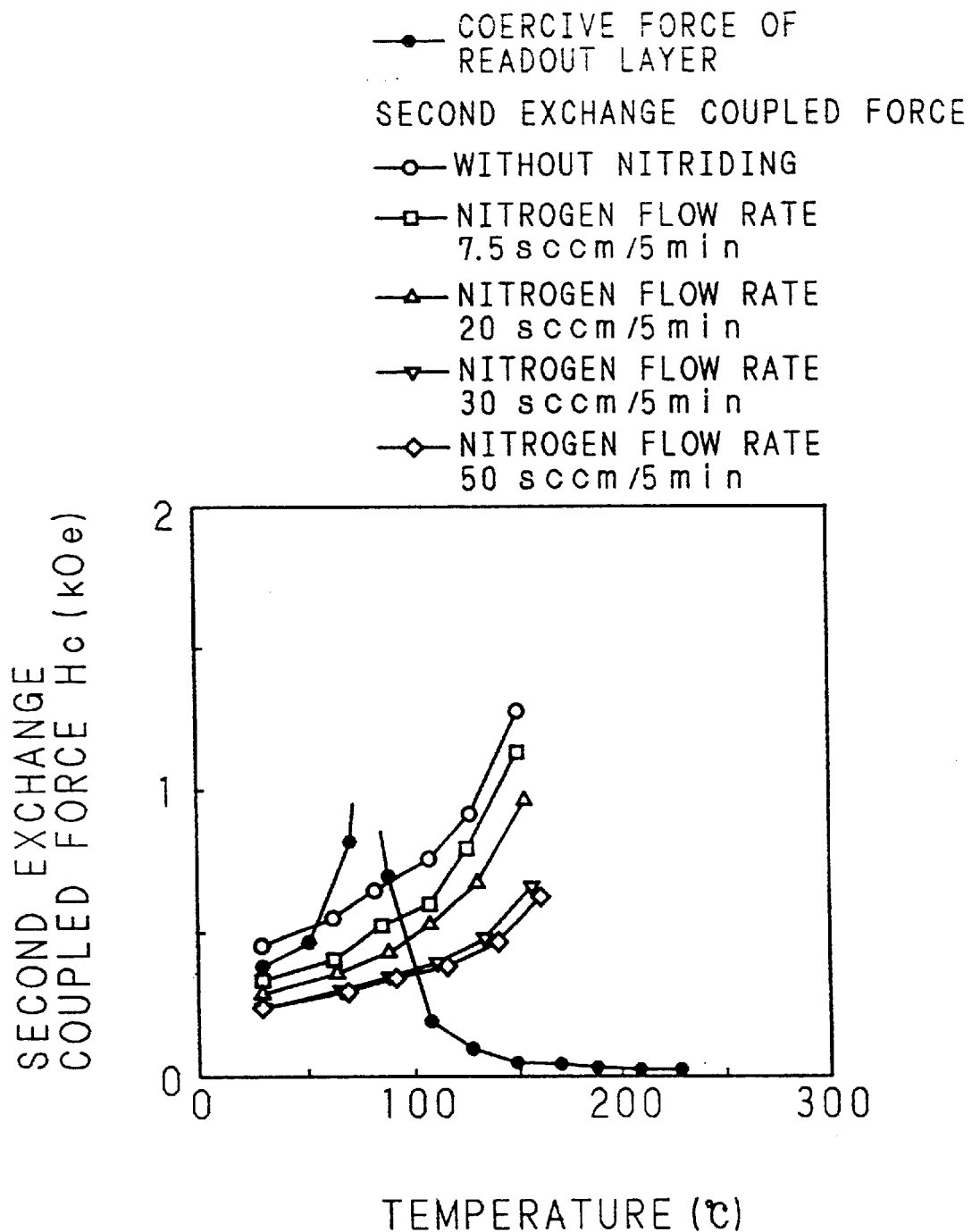
FIG. 15 is a graph showing the temperature dependence of a second exchange coupled force of a magneto-optical disk in a second embodiment.

By the DC sputtering method, a base layer 12, a readout layer 13, and an intermediate layer 14 were continuously laminated on a substrate 11. Then nitrogen was fed into a bell jar, and they were left in the nitrogen atmosphere for a predetermined time. Then, a recording layer 15 and a protective layer was laminated on the intermediate layer 14. Leaving in the nitrogen atmosphere was intended to nitride the surface on the intermediate layer 14 closer to the recording layer 15 to decrease the second exchange coupled force. The degree of decrease in the second exchange coupled force in terms of the flow rate of nitrogen in the nitriding treatment was investigated. FIG. 15 is a graph showing the results, in which the ordinate indicates the second exchange coupled force and the abscissa denotes the temperature. As clear from the graph, as the nitrogen flow rate increases, the exchange coupled force decreases, but when exceeding 30 sccm/5 min, a decrease is hardly noted, and the exchange coupled force nearly the same as that at 50 sccm/5 min is shown. On the basis of the result in FIG. 15, the surface of the intermediate layer 14 was nitrided at a flow rate of 30 sccm/5 min, and the magneto-optical disk 10 was prepared.

Figure 16:
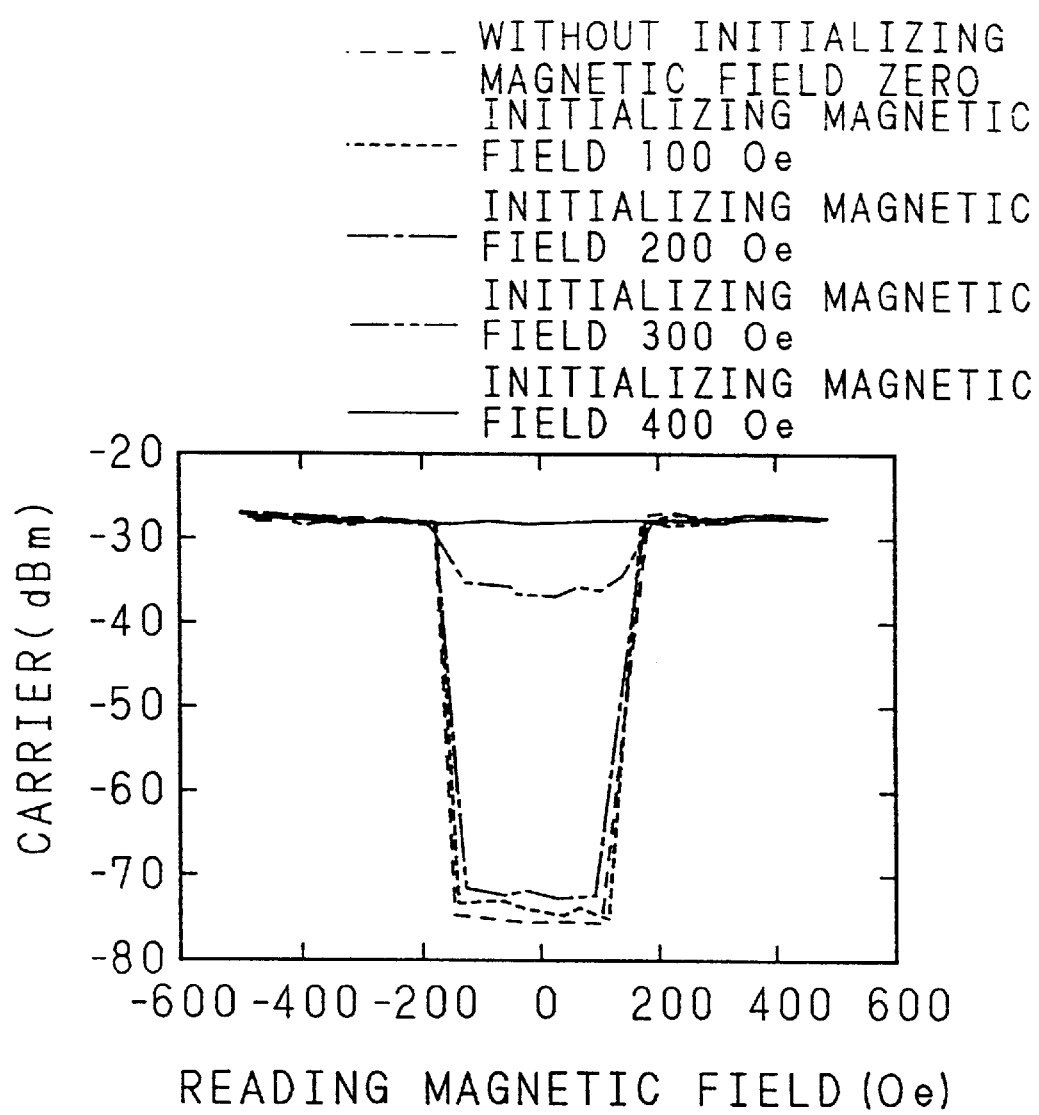
FIG. 16 is a graph showing the dependence on a reading magnetic field of the magneto-optical disk in the second embodiment.

In the magneto-optical disk produced in the above procedure, bits were formed in the recording layer 15 in the same condition as in embodiment 1, and the carrier formed on the magneto-optical disk was measured by varying the initializing magnetic field and the reading magnetic field. The initializing magnet 17 was disposed at 180 degrees, and the initializing magnetic field was applied in the recording direction for measuring. FIG. 16 is a graph showing the results, in which the ordinate indicates the carrier, and the abscissa denotes the reading magnetic field, the positive direction showing the recording direction and the negative direction, the erasing direction. As shown in the graph, when an initializing magnetic field of 300 Oe or more was applied, carrier was formed without applying a reading magnet field. When an initializing magnetic field of 400 Oe or more was applied, the CN ratio was 48 dB without application of a reading magnetic field. When an initializing magnetic field of 200 Oe or less was applied, or when an initializing magnetic field was not applied, stable carrier was produced by applying a reading magnetic field of 300 Oe or more in the recording direction or the erasing direction.

Figure 17:
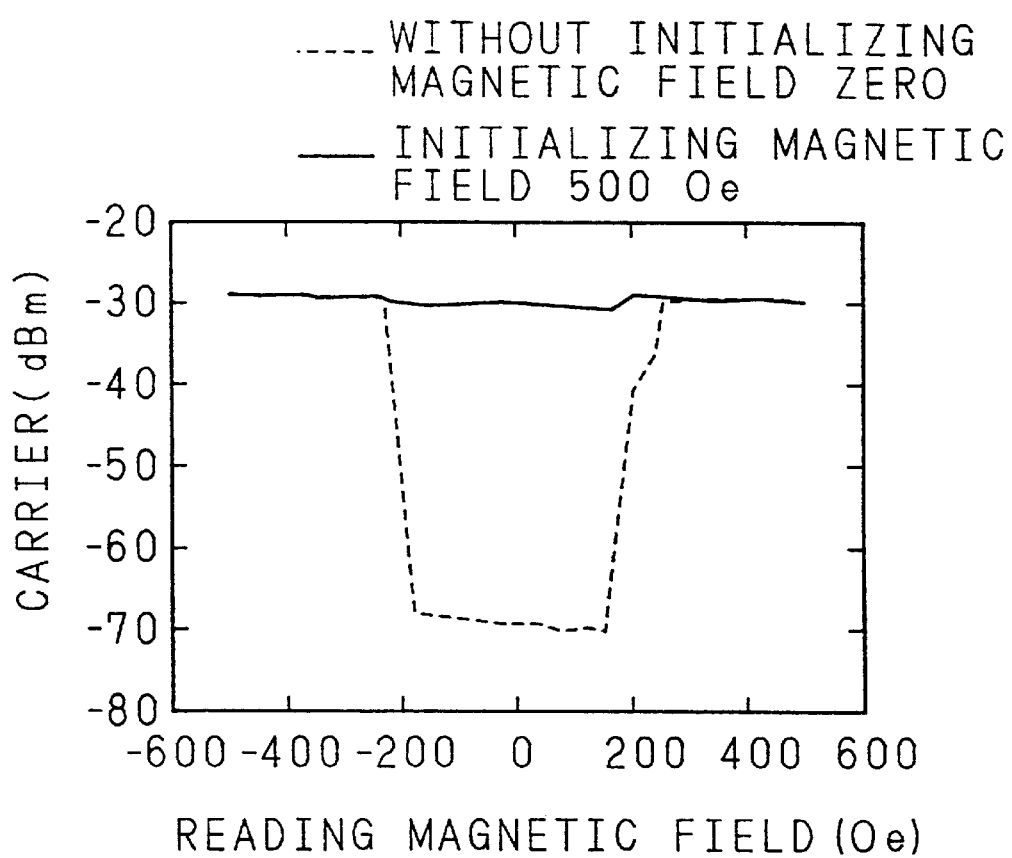
FIG. 17 is a graph showing the dependence on a reading magnetic field of another magneto-optical disk in the second embodiment.

As another example of the second embodiment, a magneto-optical disk was prepared by using a vertical magnetization film in compensatory composition in the readout layer 13, and the carrier was measure din similar conditions. FIG. 17 is a graph showing the results. The ordinate indicates the carrier, and the abscissa denotes the reading magnetic field, the positive direction showing the recording direction and the negative direction showing the erasing direction. As shown in FIG. 17, when an initializing magnetic field of 500 Oe was applied, the carrier was formed without applying a reading magnetic field. In this case, a CN ratio of 46 dB was obtained. By contrast, when an initializing magnetic field was not applied, by applying a reading magnetic field of 300 Oe or more, it can be seen that the carrier was formed. By nitriding the surface of the recording layer 15 side of the intermediate layer 14, even if the readout layer 13 is of compensatory composition, the MSR readout is realized by nullifying the reading magnetic field and applying an initializing magnetic field by the initializing magnet 17 disposed at the position of 180 degrees.

Thus, in the magneto-optical disk of embodiment 2, without application of a reading magnetic field, the MSR readout is realized by applying an initializing magnetic field of 400 Oe or more, and it can be seen that a smaller initializing magnetic field is enough as compared with embodiment 1. It can be concluded that this is because the second exchange coupled force was reduced in this embodiment, as compared with that in embodiment 1, by nitriding process.

Described specifically below are the magneto-optical disks capable of reducing the external magnetic field by decreasing the second exchange coupled force.

Embodiment 3

Figure 18:
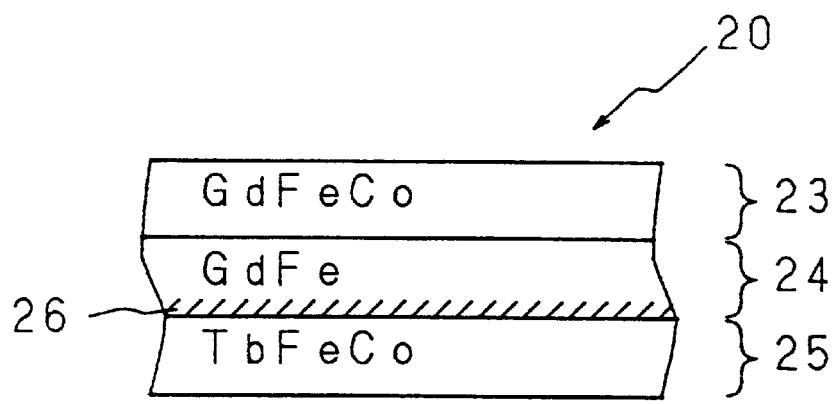
FIG. 18 is a film composition diagram of a magneto-optical disk in a third embodiment.

FIG. 18 is a diagram showing a film composition of a magneto-optical disk in a third embodiment. A magneto-optical disk 20 is formed from laminating a base layer of 70 nm in film thickness made of SiN, a readout layer 23 made of $Gd_{26}Fe_{61}Co_{13}$ (compensation temperature: 60° C., dominant: RE, film thickness: 40 nm), an intermediate layer 24 made of $Gd_{32}Fe_{68}$ (Curie temperature: 220° C., compensation temperature: -, dominant: RE, film thickness: 40 nm), a recording layer 25 made of $Tb_{24}Fe_{56}Co_{20}$ (Curie temperature: 260° C., dominant: TM, film thickness: 50 nm), and a protective layer 16 of 60 nm in film thickness made of SiN, sequentially on a polycarbonate substrate. The interface of the intermediate layer 24 closer to the recording layer 25 is nitrided, and a nitride film 26 is formed. The substrate, the base layer and the protective layer are omitted in FIG. 18.

Figure 19:
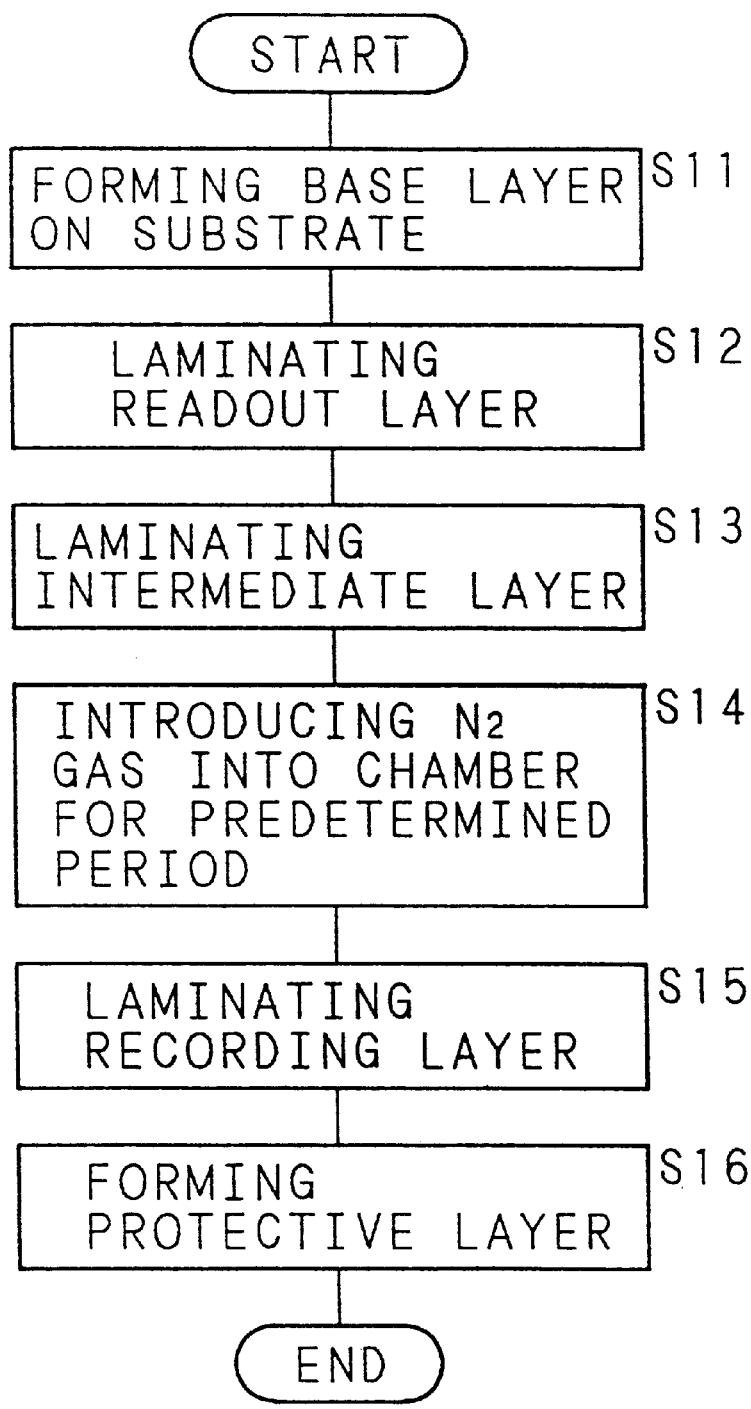
FIG. 19 is a flow chart showing the production procedure of a magneto-optical disk in the third embodiment.

Each layer is formed sequentially by the DC sputtering method. FIG. 19 is a flowchart showing the production procedure of the magneto-optical disk 20, and the forming method of each layer is explained on the basis thereof. As the sputtering condition, when forming the SiN layer, a mixed gas of Ar and $N_2$ is used, and pure Ar gas is sued when forming the magnetic layers. The film is formed in a chamber at a final degree of vacuum of $5 \times 10^{-5}$ Pa or less. After forming the base layer on the substrate (step S11), the readout layer 23 (step S12) and intermediate layer 24 (step S13) are laminated continuously. Then, $N_2$ gas is introduced into the chamber, and nitrogen molecules are diffused on the surface of the intermediate layer 24, and the nitride film 26 is formed (step S14). At this time, the pressure if 1.2 Pa in the chamber. After introducing $N_2$ gas, the recording layer 25 (step S15) and the protective layer (step S16) are laminated continuously on the nitride film 26. The nitriding process at step S14 was intended to form a nitride film on the surface of the intermediate layer 24 closer to the recording layer 25 decrease the exchange coupled force of the intermediate layer 24 and the recording layer 25.

The recording and reading characteristics of the magneto-optical disk 20 produced in this procedure were investigated. First, an erasing laser beam is emitted at a power of 8 mW, and an erasing magnetic field of upward direction is applied by 500 Oe, and the entire surface of the magneto-optical disk 20 is erased. Then, while rotating the magneto-optical disk 20 at a linear velocity of 6 m/s, a recording laser beam is emitted at a power of 7 mW, and a recording magnetic field of downward direction is applied by 400 Oe, and recording is done at a frequency of 7.5 MHz and a duty of 50%. The bit length in the peripheral direction is 0.4 $\mu$m. The wavelength of laser beam is 680 nm.

Figure 20:
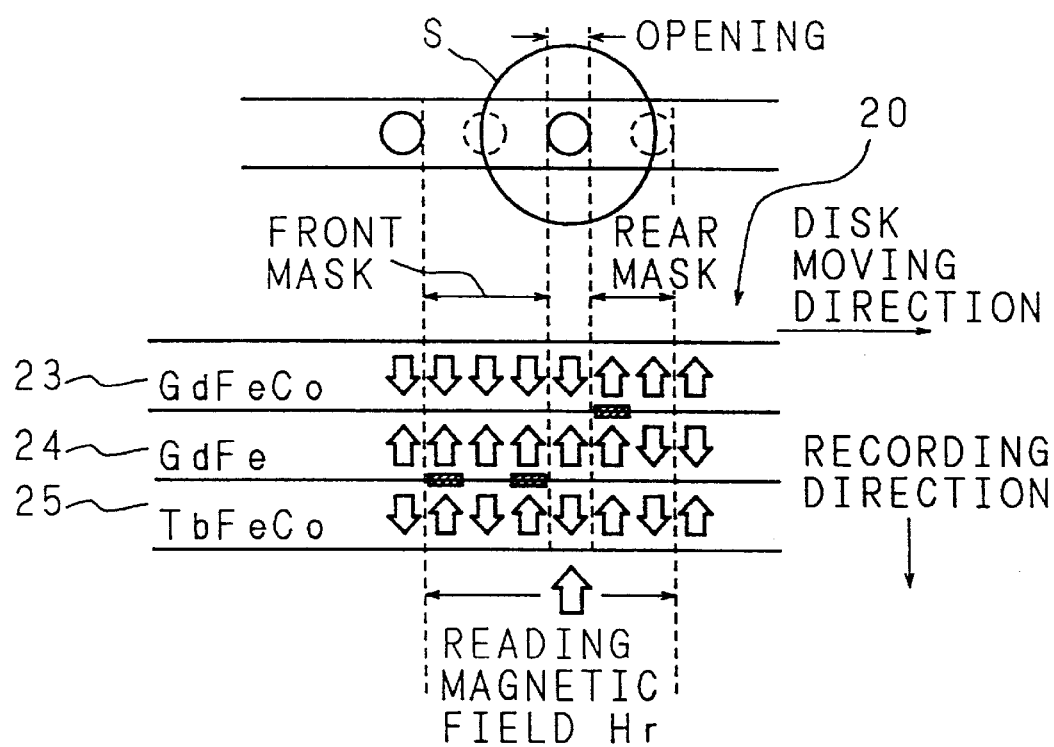
FIG. 20 is a diagram showing a magnetization state at the reading time of the magneto-optical disk in the third embodiment.

When reading this magneto-optical disk 20, a reading magnetic field of upward direction is applied while emitting reading laser beam. When laser beam with reading power of 2.5 mW was emitted, a double mask was formed, and the MSR readout was enabled. FIG. 20 is a diagram showing the magnetization state at the reading time of the magneto-optical disk 20. As shown in FIG. 20, in the low-temperature region (a region lower than about 100° C.) ahead of the beam spot S, the applied reading magnetic field Hr is greater than the second exchange coupled force, so that the intermediate layer 24 was aligned in the same direction as the reading magnetic field Hr, and a front mask was formed. In the intermediate-temperature region (a region of about 100° C. to about 180° C.) in the opening inside the beam spot S, the first and second exchange coupled forces act, and the bits in the recording layer 25 are transferred to the readout layer 23. In the high-temperature region (a region of about 180° C.) behind the beam spot S, the reading magnetic field Hr is greater than the first exchange coupled force, so that the reading layer 23 was aligned in the same direction as the reading magnetic field Hr, and a rear mask was formed. The erasing magnetic field, the recording magnetic field and the reading magnetic field are applied by using an electromagnet.

At this time, the reading magnetic field Hr was 200 Oe. When reading a conventional MSR medium of which magnetic layer is not nitrided, the reading magnetic field Hr of about 450 Oe is needed, and hence in this embodiment the reading magnetic field Hr was reduced by more than 200 Oe. When reading the magneto-optical disk 20 of the embodiment, the CN ratio was 49 dB, which was similar to that of the conventional magneto-optical disk, and the transfer performance was favorable. It was thus found that the reading magnetic field Hr can be reduced by nitriding the surface of the intermediate layer 24 closer to the recording layer 25 to decrease the second exchange coupled force.

A similar magneto-optical disk 20 to embodiment 3 was formed by extending the nitrogen feed time to 15 minutes. In this magneto-optical disk, the MSR readout was enabled by application of a reading magnetic field of 200 Oe, and the same results as in embodiment 3 were obtained. As a result, it was found that the magnitude of the second exchange coupled force does not depend on the length of the time for nitriding the surface of the intermediate layer 24.

Embodiment 4

Figure 21:
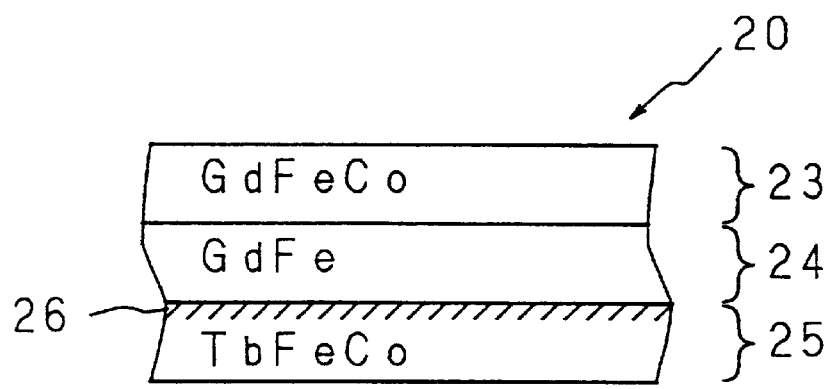
FIG. 21 is a film composition diagram of a magneto-optical disk in a fourth embodiment.

In embodiment 3, after forming the intermediate layer 24, nitrogen is fed in and the intermediate layer 24 is nitrided, whereas in embodiment 4, an magneto-optical disk 20 is formed by nitriding the side of the recording layer 25 closer to the intermediate layer 24, and its playback characteristic is investigated. FIG. 21 is a diagram showing the film composition of the magneto-optical disk 20 in embodiment 4. The film material composition is the same as that in embodiment 3 except that a nitride film 26 of a predetermined film thickness is formed at the side of the recording layer 25 closer to the intermediate layer 24, and its explanation is omitted.

When forming the magneto-optical disk 20 of embodiment 4, after continuously laminating the base layer, the readout layer 23, and the intermediate layer 24 on the substrate, the nitride film 26 portion of the recording layer 25 is formed by using a mixed gas of Ar and $N_2$. At this time, the pressure is 3.6 Pa in the chamber. After forming the nitride film 26 in a predetermined film thickness, $N_2$ is exhausted, and by using Ar gas only, the recording layer 25 is laminated again. The other procedures than forming the nitride film 26 are the same as in the flowchart shown in FIG. 19, and a mixed gas is supplied to form the nitride film 26 instead of the process of feeding $N_2$ gas only at step S14.

The magneto-optical disks 20 of such a composition were prepared with the varied film thickness of the nitride film 26 of 0.5 nm and 2 nm, respectively, and their recording and playback characteristics were investigated. The recording and playback conditions are the same as in embodiment 3. As a result, double mask readout was enabled in both magneto-optical disks 20, but in the nitride film 26 of 2 nm, the CN ratio was only 36 dB. In the nitride film 26 of 0.5 nm, a sufficient value of CN ratio was obtained. Hence it can be seen that the second exchange coupled force is decreased too much when the nitride film thickness is excessive so that the transfer performance in the opening deteriorates, thereby lowering the CN ratio. Thus, by forming the nitride film 26 of a predetermined film thickness at the side of the recording layer 25 closer to the intermediate layer 24 to decrease the second exchange coupled force, it is found that the reading magnetic field Hr can be reduced.

Embodiment 5

Figure 22:
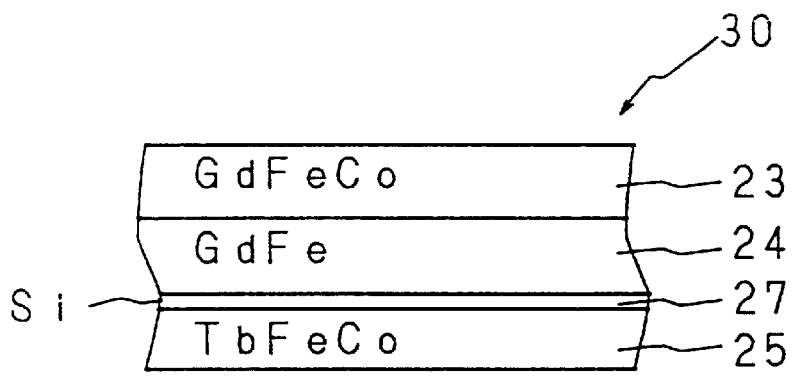
FIG. 22 is a film composition diagram of a magneto-optical disk in a fifth embodiment.

FIG. 22 is a diagram showing the film composition of a magneto-optical disk of embodiment 5. A magneto-optical disk 30 of embodiment 5 has a control film 27 made of silicon (Si) interposed between an intermediate layer 24 and a recording layer 25, and the control film 27 functions to control the second exchange coupled force. The control film 27 may be a semiconductor film of Si or the like, a nitride film or oxide film of Si, a non-magnetic film of Al, Ti, Cu, Au or their nitride or oxide, or anti-ferromagnetic film of Cr or the like. The rest of the film constitution and film composition are the same as in embodiment 3, and the explanation is omitted.

When forming the magneto-optical disk 30 of such composition, after continuously laminating the base layer, the readout layer 23 and the intermediate layer 24 on the substrate, the control film 27 made of Si is formed by RF sputtering method. After forming the control film 27 in a predetermined film thickness, the recording layer 25 is laminated again by DC sputtering method. The other procedures, than forming the control film 27 are the same as in the flowchart shown in FIG. 19, and the control film 27 is formed instead of the process of feeding $N_2$ gas only at step S14.

The magneto-optical disks 30 of such composition were prepared with the varied film thickness of the control film 27 of 0.5 nm and 1.0 nm, respectively, and their recording and playback characteristics were studied. The recording and playback conditions are the same as in embodiment 3. As a result, in the control film 27 of 0.5 nm, the MSR readout was enabled by the reading magnetic field Hr of about 200 Oe, and the transfer property was not deteriorated. By contrast, in the control film 27 of 1.0 in film thickness, bits in the recording layer 25 could not be transferred or read out. Hence it can be concluded that the second exchange coupled force is decreased too much when the film thickness of the control film 27 made of semiconductor, non-magnetic material or anti-ferromagnetic material is excessive so that the transfer performance in the opening deteriorates, thereby lowering the CN ratio. Thus, by forming the control film 27 of a predetermined film thickness for decreasing the exchange coupled force between the intermediate layer 24 and the recording layer 25 to decrease the second exchange coupled force, it is found that the reading magnetic field Hr can be reduced.

Embodiment 6

In the foregoing embodiments 3 and 4, the second exchange coupled force is decreased by nitriding the interface of the intermediate layer 24 and the recording layer 25, but the reading magnetic field can be reduced also by forming a magnetic layer, large in the in-plane magnetic anisotropy in the low-temperature region and large in the perpendicular magnetic anisotropy in the intermediate-temperature region, at the interface of the intermediate layer 24 and the recording layer 25. The magneto-optical disk of such a constitution is described below.

Figure 23:
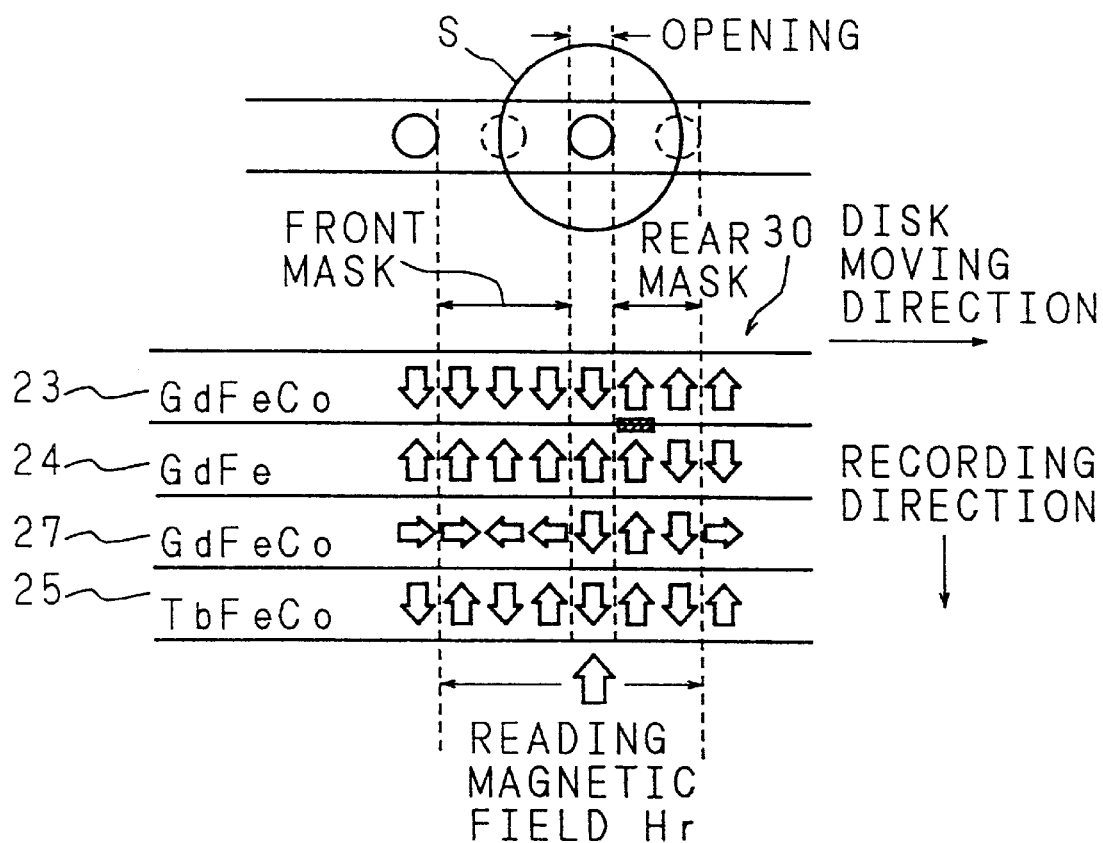
FIG. 23 is a diagram showing a film composition and a magnetization state when reading of a magneto-optical disk in a sixth embodiment.

FIG. 23 is a diagram showing the film composition of the magneto-optical disk of embodiment 6 and a magnetization state in a mode of reading out. The magneto-optical disk 30 of embodiment 6 is composed by laminating a base layer of 70 nm in film thickness made of SiN, a readout layer 23 made of $Gd_{26}Fe_{61}Co_{13}$ (compensation temperature: 60° C., dominant: RE, film thickness: 40 nm), an intermediate layer 25 made of $Gd_{33}Fe_{68}$ (Curie temperature: 220° C., compensation temperature: -, dominant: RE, film thickness: 40 nm), a control film 27 made of $Gd_{33}Fe_{38}Co_{29}$ (Curie temperature: >400° C., compensation temperature: 220° C., dominant: RE, film thickness: 5 nm), a recording layer 25 made of $Tb_{24}Fe_{56}Co_{20}$ (Curie temperature: 260° C., dominant: TM, film thickness: 50 nm), and a protective layer 16 of 60 nm in film thickness made of SiN, sequentially on a polycarbonate substrate. The control film 27 interposed between the intermediate layer 24 and the recording layer 25 is formed for the purpose of controlling the second exchange coupled force. In FIG. 23, the substrate, the base layer, and the protective layer are omitted.

When forming thus constituted magneto-optical disk 30, after laminating the base layer, the readout layer 23 and the intermediate layer 24 on the substrate, the control film 27 of film thickness of 5 nm and recording layer 25 are laminated continuously. The other procedures than forming the control film 27 are the same as in the flowchart shown in FIG. 19, and the control film 27 is formed instead of the process of feeding $N_2$ gas only at step S14.

As shown in FIG. 23, in the low-temperature region (a region lower than about 100° C.) at the forward side of the beam spot S, the magnetization direction of the control film 27 is facing the in-plane direction, and the second exchange coupled force is decreased. Accordingly, by application of a smaller reading magnetic field Hr than in the case of film composition without control film 27, the intermediate layer 24 and the readout layer 23 form a front mask. In the opening (a region of about 100° C. to about 180° C.) in the beam spot S, the magnetization direction of the control film 27 is the perpendicular direction, and the second exchange coupled force is intensified between the recording layer 25 an the intermediate layer 24. In the high-temperature region (a region higher than about 180° C.) at the backward side of the beam spot S, similarly, the second exchange coupled force is intensified, but the readout layer 23 of which the first exchange coupled force is cut off aligns the magnetization direction in the reading magnetic field Hr, and a rear mask is formed.

Thus composed magneto-optical disk 30 of embodiment 6, and magneto-optical disks of comparative examples A, B and C differing in the composition of the intermediate layer 24 and the control film 27 were prepared, and their recording and playback characteristics were investigated. Each composition and result of the recording and playback characteristics are shown in Table 1. The magnetic characteristics of the rare earth-transition metal alloy used in the intermediate layer 24 and the control film 27 are shown in Table 2. In the results of recording and playback characteristics, ○-mark was put in the Hr column when the double mask was formed by a smaller reading magnetic field than in the prior art, and X-mark when not formed, and ○-mark was put in the C/N column when the playback characteristic was excellent, and X-mark when deteriorated.

TABLE 1

TABLE 2

Figure 3:
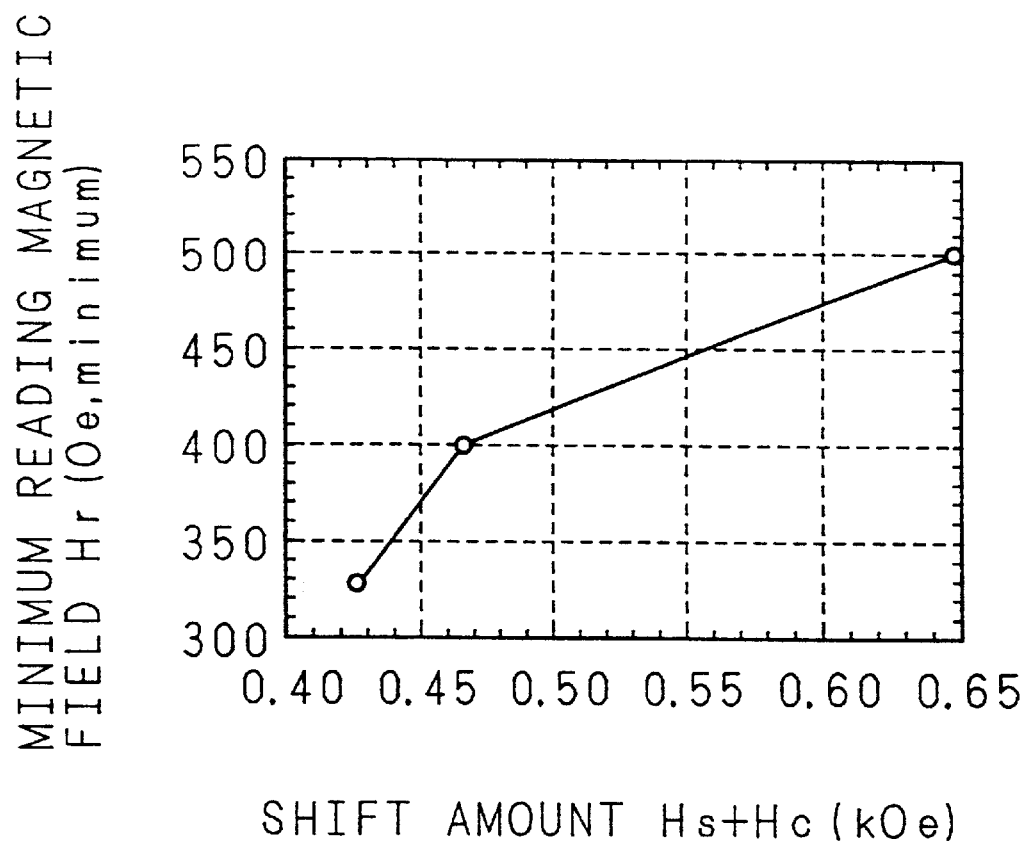
FIG. 3 is a graph showing the relation of a shift amount and a minimum reading magnetic field in a conventional magneto-optical disk.
Figure 4:
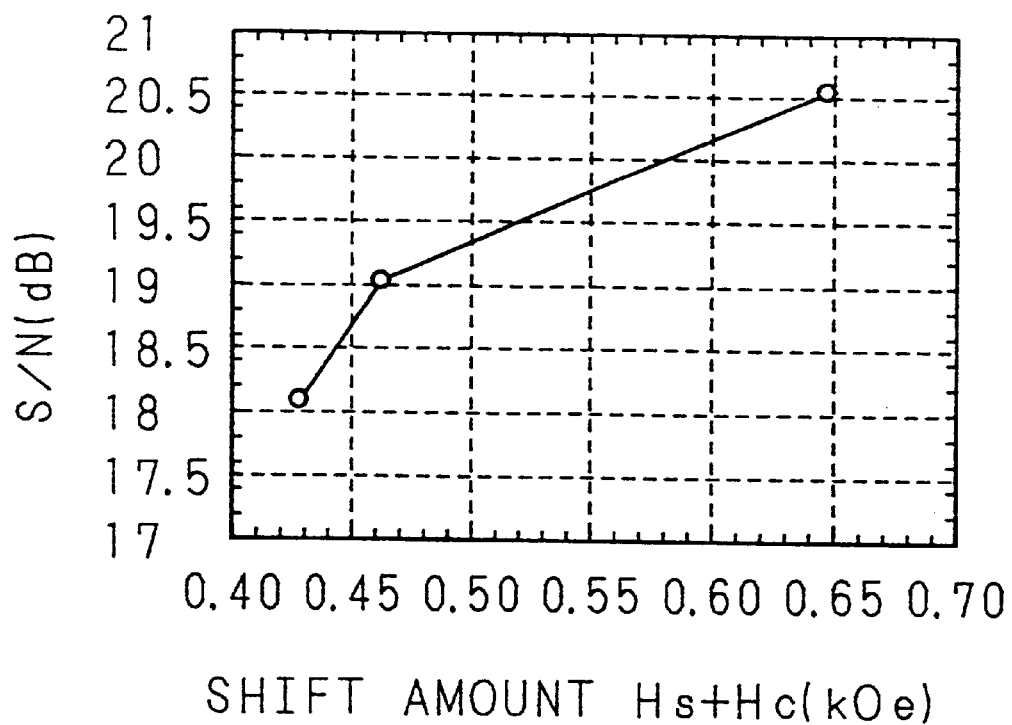
FIG. 4 is a graph showing the relation of a shift amount and an SN ratio in a conventional magneto-optical disk.

As shown in TABLE 1, in the magneto-optical disk 30 of embodiment 6, the MSR readout was enabled at the reading magnetic field Hr of 200 Oe, and the CN ratio of 49 dB was obtained. By contrast, in comparative example A, although the reading magnetic field Hr could be reduced, the CN ratio was low, and the transfer property deteriorated. In comparative example B and the comparative example C, a sufficient CN ratio was obtained, but the reading magnetic field Hr could not be reduced. As shown in TABLE 2, since $Gd_{31}Fe_{66}$ in comparative example A is higher in Gd composition than in $GD_{33}Fe_{66}$, the exchange coupled force is weak. Deterioration of the transfer property in comparative example A seems to be caused by the weak exchange coupled force of the intermediate layer 24 in both regions of the low-temperature region and the intermediate-temperature region, thereby lowering the CN ratio and deteriorating the playback performance (see FIG. 3 and FIG. 4). In comparative examples B and C, the deterioration seems to occur because the temperature range in which the control film 27 is oriented in the vertical magnetization direction is largely distributed to the lower temperature than the Curie temperature, and the second exchange coupled force is intensified in the low-temperature region, and front mask is not formed in the small reading magnetic field Hr.

By contrast, in embodiment 6, since the temperature range in which the control film 27 is oriented in the vertical magnetization direction is near the Curie temperature of the intermediate layer 24, in the low-temperature region of the magneto-optical disk 30, the second exchange coupled force is decreased, whereas the second exchange coupled force is intensified in the opening. Therefore, if a lower reading magnetic field Hr is applied, the front mask is formed, and the transfer property is excellent. Thus, the control film 27 is an RE rich in-plane magnetization film at a room temperature lower than about 100° C., and when the temperature range in which the control film 27 is a vertical magnetization film is in the transfer temperature region, that is, near the Curie temperature of the intermediate layer 24, by interposing the control film 27 between the intermediate layer 24 and the recording layer 25, it can be seen that the reading magnetic field Hr can be reduced without deteriorating the playback characteristic.

Meanwhile, a magneto-optical disk was prepared by laminating the control film 27 of embodiment 6 in a film thickness of 5 nm or more, and the recording and playback characteristics were similarly measured, and the double mask was formed by a small reading magnetic field, but the readout signal amplitude and CN ratio were lowered. Thus, when the film thickness of the control film 27 is greater than 5 nm, the second exchange coupled force is decreased in both regions of low-temperature region and the intermediate-temperature region, and thereby the playback characteristic deteriorates.

In the above embodiment, the nitride film 26 formed between the intermediate layer 24 and the recording layer 25 is not restrictive to the aforementioned one, but an oxide film being oxidized may be also used. By feeding the oxygen by the same amount as the feed of nitrogen, the interface of the intermediate layer 24 and the recording layer 25 is oxidized, and the second exchange coupled force is decreased, so that similar effects may be obtained.

Moreover, by the control layer for decreasing the second exchange coupled force, the second exchange coupled force is decreased in the low-temperature region, and the mask can be formed by application of a small reading magnetic field, and thereby the power consumption can be saved. Still more, in the intermediate-temperature region which is the transfer region, the control layer has the perpendicular magnetic anisotropy, and the second exchange coupled force is decreased, and the transfer performance is improved, and the invention brings about many other effects.

As the invention may be embodied in several forms without departing from the spirit of essential characteristics thereof, the present embodiments are therefore illustrative and not restrictive, since the scope of the invention is defined by the appended claims rather then by the description preceding them, and all changes that fall within metes and bounds of the claims, or equivalence of such metes and bounds thereof are therefore intended to be embraced by the claims.

TABLE 1

|  |  | READOUT LAYER | INTERMIDIATE LAYER | COMTROL FILM | RCORDING LAYER | Hr | C/N |
|---|---|---|---|---|---|---|---|
| EMBODIMENT 6 |  | $Gd_{26}Fe_{61}Co_{13}$ | $Gd_{32}Fe_{68}$ | $Gd_{33}Fe_{33}Co_{29}$ | $Tb_{24}Fe_{56}Co_{20}$ | ○ | ○ |
| COMPARATIVE EXAMPLE | A | $Gd_{26}Fe_{61}Co_{13}$ | $Gd_{34}Fe_{66}$ | — | $Tb_{24}Fe_{56}Co_{20}$ | ○ | X |
|  | B | $Gd_{26}Fe_{61}Co_{13}$ | $Gd_{32}Fe_{68}$ | $Gd_{29}Fe_{55}Co_{16}$ | $Tb_{24}Fe_{56}Co_{20}$ | X | ○ |
|  | C | $Gd_{26}Fe_{61}Co_{13}$ | $Gd_{32}Fe_{68}$ | $Gd_{29}Fe_{47}Co_{24}$ | $Tb_{24}Fe_{56}Co_{20}$ | X | ○ |

TABLE 2

| COMPOSITION | CURIE TEMPERATURE (° C.) | TEMPERATURE REGION OF PERPENDICULAR MAGNETIZATION DOMINANT (° C.) | COMPENSATION TEMPERATURE (° C.) | DOMINANT |
|---|---|---|---|---|
| $Gd_{32}Fe_{68}$ | 220 | — | — | RE |
| $Gd_{34}Fe_{66}$ | 220 | — | — | RE |
| $Gd_{29}Fe_{55}Co_{16}$ | 320 | 60–320 | 220 | RE |
| $Gd_{29}Fe_{47}Co_{24}$ | ≧400 | 130–230 | 180 | RE |
| $Gd_{33}Fe_{38}Co_{29}$ | >400 | 210–230 | 220 | RE |

The composition of magnetic film, the film thickness and other conditions in the foregoing embodiments are not restrictive, but only examples are presented.

Thus, in the invention, after aligning the first magnetic layer by applying a magnetic field in the low-temperature region of the magneto-optical recording medium, the magnetization direction of the first magnetic layer does not return to the initial stat without application of a reading magnetic field near the irradiation spot, and information can be read out from the intermediate-temperature region, so that the power consumption can be saved. Besides, a magnet for applying a magnetic field at the low-temperature position of the magneto-optical recording medium is disposed at the lower temperature position form the opposite side in the radial direction of the light beam source, and therefore the time from alignment of the magnetization direction to reproduction is shortened, and the mask can be formed securely at the low-temperature region without application of reading magnetic field.

We claim:

1. A method of reading out a magneto-optical recording medium which includes a magnetically coupled first magnetic layer, a second magnetic layer formed on said first magnetic layer and a third magnetic layer formed on said second layer, and has information recorded by forming in said third magnetic layer a first region inverted in the magnetization direction from a first direction to a second direction and a second region maintaining the first direction in said third magnetic layer; the method comprising the steps of:

irradiating the magneto-optical recording medium with light beam so as to form a temperature distribution in a relative movement of the medium and the light beam;

applying a magnetic field in the second direction to a region which is not irradiated with the light beam, so as to align the magnetization directions of said first magnetic layer and second magnetic layer in a region where the temperature is lower than that of a information readout temperature region specified by the temperature distribution; and reading out the information in said information readout temperature region.

2. The reading method according to claim 1, wherein said first magnetic layer and said second magnetic layer has a first exchange coupled force therebetween, said second magnetic layer and said third magnetic layer has a second exchange coupled force therebtween, said first exchange coupled force decreasing with the increasing temperature, and said second exchange coupled force increasing with the increasing temperature, and said second exchange coupled force is not larger than the coercive force of said first magnetic layer at a temperature lower than the predetermined temperature for reading out the information.

3. An apparatus of reading out a magneto-optical recording medium which includes a magnetically coupled first magnetic layer, a second magnetic layer formed on said first magnetic layer and a third magnetic layer formed on said second layer, and has information recorded by forming in said third magnetic layer a first region magnetized in a first direction and a second region magnetized in a second direction in said third magnetic layer; the apparatus comprising:

a light source for irradiating the magneto-optical recording medium with light beam so as to form a temperature distribution, the light source and the recording medium being mutually movable in relation to one to another; and a magnet disposed at a position having a temperature lower than that of a region opposite to the place from which the light beam is irradiated, with respect to the middle of the recording medium such that a magnetic field is generated so as to align the magnetization directions of said first magnetic layer and second magnetic layer.

4. The reading apparatus according to claim 3, wherein said first magnetic layer and said second magnetic layer has a first exchange coupled force therebetween, said second magnetic layer and said third magnetic layer has a second exchange coupled force therebetween, said first exchange coupled force decreasing with the increasing temperature, and said second exchange coupled force increasing with the increasing temperature, and said second exchange coupled force not being larger than the coercive force of said first magnetic layer at a temperature lower than the predetermined temperature for reading out the information.

* * * * *